US008941026B2

(12) United States Patent
Krink et al.

(10) Patent No.: US 8,941,026 B2
(45) Date of Patent: Jan. 27, 2015

(54) NOZZLE FOR A LIQUID-COOLED PLASMA TORCH, NOZZLE CAP FOR A LIQUID-COOLED PLASMA TORCH AND PLASMA TORCH HEAD COMPRISING THE SAME

(75) Inventors: Volker Krink, Finsterwalde (DE); Frank Laurisch, Finsterwalde (DE); Timo Grundke, Finsterwalde (DE)

(73) Assignee: Kjellberg Finsterwalde Plasma und Maschinen GmbH, Finsterwalde (DE)

( * ) Notice: Subject to any disclaimer, the term of this patent is extended or adjusted under 35 U.S.C. 154(b) by 936 days.

(21) Appl. No.: 13/123,592

(22) PCT Filed: Aug. 14, 2009

(86) PCT No.: PCT/DE2009/001169

§ 371 (c)(1),
(2), (4) Date: Apr. 11, 2011

(87) PCT Pub. No.: WO2010/040328

PCT Pub. Date: Apr. 15, 2010

(65) Prior Publication Data

US 2011/0284502 A1 Nov. 24, 2011

(30) Foreign Application Priority Data

Oct. 9, 2008 (DE) ........................ 10 2008 050 770
Jan. 26, 2009 (DE) ........................ 10 2009 006 132

(51) Int. Cl.
*B23K 10/00* (2006.01)
*H05H 1/28* (2006.01)
*H05H 1/34* (2006.01)

(52) U.S. Cl.
CPC . *H05H 1/28* (2013.01); *H05H 1/34* (2013.01); *H05H 2001/3457* (2013.01); *H05H 2001/3478* (2013.01)
USPC .............. 219/121.5; 219/121.49; 219/121.51; 219/75; 313/231.41

(58) Field of Classification Search
CPC ............ H05H 1/28; H05H 1/34; H05H 1/26; B23K 10/00
USPC ......... 219/121.5, 121.51, 121.52, 75, 121.48; 313/231.51
See application file for complete search history.

(56) References Cited

U.S. PATENT DOCUMENTS 5,120,930 A 6/1992 Sanders et al.
7,683,342 B2 * 3/2010 Morfill et al. ................ 250/427

(Continued)

FOREIGN PATENT DOCUMENTS

DE 36014 8/1967
DE 1565638 A1 4/1970

(Continued)

OTHER PUBLICATIONS

International Search Report—PCT/DE2009/001169.

*Primary Examiner* — Mark Paschall
(74) *Attorney, Agent, or Firm* — Jonathan M. D'Silva; MacDonald, Illig, Jones & Britton LLP

(57) ABSTRACT

A nozzle for a liquid cooled plasma torch includes a nozzle bore for the exit of a plasma gas beam at a nozzle tip, a first section, of which the outer surface is essentially cylindrical, and a second section connecting the nozzle tip, of which the second section the outer surface tapers essentially conically towards the nozzle tip, wherein at least one liquid supply groove is provided and extends over a part of the first section and over the second section in the outer surface of the nozzle towards the nozzle tip and at least one liquid return groove separate from the liquid supply groove is provided and extends over the second section.

49 Claims, 28 Drawing Sheets

(56) References Cited

U.S. PATENT DOCUMENTS

| | | | | |
|---|---|---|---|---|
| 8,389,887 | B2 * | 3/2013 | Liebold et al. | 219/121.5 |
| 2005/0082263 | A1 | 4/2005 | Koike et al. | |
| 2008/0093346 | A1 * | 4/2008 | Yamaguchi et al. | 219/121.49 |
| 2008/0210669 | A1 * | 9/2008 | Yang et al. | 219/121.49 |
| 2009/0230095 | A1 * | 9/2009 | Liebold et al. | 219/121.5 |
| 2012/0055906 | A1 * | 3/2012 | Shipulski et al. | 219/121.49 |
| 2013/0026141 | A1 * | 1/2013 | Liebold et al. | 219/121.49 |

FOREIGN PATENT DOCUMENTS

| | | | |
|---|---|---|---|
| DE | OS 1 565 638 | | 4/1970 |
| DE | 83890 | | 5/1973 |
| DE | 25 25 939 | | 12/1976 |
| DE | 26 51 185 | | 11/1978 |
| DE | 40 30 541 | | 4/1992 |
| DE | 198 28 633 | | 12/1999 |
| DE | 692 33 071 | T2 | 3/2004 |
| DE | 10 2007 005 316 | | 3/2008 |
| EP | 0585977 | A1 | 3/1994 |
| EP | 0794697 | B1 | 5/2003 |
| EP | 1 524 887 | | 4/2005 |
| GB | 1416783 | A | 12/1975 |
| WO | WO 92/00658 | | 1/1992 |
| WO | WO 92/01360 | | 1/1992 |

* cited by examiner

NOZZLE FOR A LIQUID-COOLED PLASMA TORCH, NOZZLE CAP FOR A LIQUID-COOLED PLASMA TORCH AND PLASMA TORCH HEAD COMPRISING THE SAME

BACKGROUND

The present invention relates to a nozzle for a liquid cooled plasma torch, a nozzle cap for a liquid cooled plasma torch and a plasma torch head with same.

A plasma is an electrically conductive gas thermally heated to a high temperature and consisting of positive and negative ions, electrons and excited and neutral atoms and molecules.

Different gases are used as plasma gas, for example the single-atom argon and/or the two-atom gases hydrogen, nitrogen, oxygen, and air. These gases ionise and dissociate through the energy of an arc. The arc constricted through a nozzle is described as a plasma beam.

The parameters of a plasma beam can be greatly influenced by the form of the nozzle and electrode. Such parameters of the plasma beam can, for example, include the beam diameter, temperature, energy density and the flow speed of the gas.

In plasma cutting, for example, plasma is constricted through a nozzle which can be gas cooled or water cooled. Energy densities of up to $2\times10^6$ W/cm$^2$ can thereby be reached. Temperatures of up to 30,000° C. arise in the plasma beam, which realize, in association with the high flow speed of the gas, very high material cutting speeds.

Plasma torches can be operated directly or indirectly. In a direct mode of operation, current flows from a current source via the electrode of a plasma torch. The plasma beam produced by means of an arc and constricted through the nozzle directly via the work piece back to the current source. Electrically conductive materials can be cut with such direct mode of operation.

In an indirect mode of operation, current flows from the current source via the electrode of a plasma torch, the plasma beam, produced by means of an arc and constricted through a nozzle, and the nozzle back to the current source. The nozzle is thereby more greatly loaded than during direct plasma cutting, as it does not only constrict the plasma beam but also realizes the starting point of the arc. With such indirect mode of operation, both electrically conductive and non-electrically conductive materials can be cut.

Due to high thermal load, nozzles are generally made from a metal material, preferably from copper due to its high electrical conductivity and heat conductivity. The same applies to the electrode holders, which are also frequently made from silver. The main components of a plasma torch include a plasma torch head, a nozzle cap, a plasma gas guiding part, a nozzle, a nozzle holder, an electrode receiving element, an electrode holder with electrode insert and, in modern plasma torches, a nozzle protection cap holder and a nozzle protection cap. The electrode holder fixes a sharp electrode insert made of tungsten, which is suited for the use of non-oxidizing gases such as plasma gas, for example an argon-hydrogen mixture. A flat electrode, of which the electrode insert is made, for example, of hafnium, is also suited for the use of oxidizing gases such as plasma gas, for example air or oxygen. In order to achieve a longer lifespan for the nozzle, the latter is cooled with a liquid such as water. The coolant is supplied via a water supply element to the nozzle and carried away from the nozzle by a water return element and thereby flows through a coolant chamber, which is delimited by the nozzle and the nozzle cap.

Former East Germany document DD 36014 B1 describes a nozzle. This consists of a material with good conductivity, for example copper, and has a geometric form assigned to the respective plasma torch type, for example a conically formed discharge chamber with a cylindrical nozzle outlet. The outer form of the nozzle is formed as a cone, whereby a virtually equal wall thickness is achieved, and whereby such dimensions allow that good stability of the nozzle and good head conduction to the coolant. The nozzle is located in a nozzle holder. The nozzle holder consists of corrosion resistant material, for example brass, and has internally a centring receiving element for the nozzle and a groove for a sealing rubber, which seals the discharge chamber against the coolant. Furthermore, bores offset by 180° are disposed in the nozzle holder for the coolant supply and return. On the outer diameter of the nozzle holder there is a groove for a rubber o-ring for sealing the coolant chamber in relation to the atmosphere and also a thread and a centring receiving element for a nozzle cap. The nozzle cap, made of a corrosion resistant material such as brass, is formed at an acute angle and has a wall thickness usefully dimensioned to facilitate removal of radiation heat to the coolant. The smallest inner diameter is provided with an o-ring. Water is used as a coolant in the simplest case. This arrangement is intended to facilitate simple manufacture of the nozzles with sparing use of materials and rapid exchange of the nozzles as well as allowing, through acute angle construction, a pivoting of the plasma torch in relation to the work piece to allow for inclined cuts.

German document DE-OS 1 565 638 describes a plasma torch, preferably for plasma fusion cutting of work pieces and for preparation of welding edges. The narrow form of the torch head is achieved through the use of a particularly acute-angled cutting nozzle, of which the inner and outer angles are equal to each other and also equal to the inner and outer angle of the nozzle cap. A coolant chamber is formed between the nozzle cap and the cutting nozzle, in which coolant chamber the nozzle cap is provided with a collar, which seals metallically with the cutting nozzle, so that an even annular gap is thereby formed as a coolant chamber. The supply and removal of the coolant, generally water, is realized through two slots in the nozzle holder, which are arranged offset in relation to each other by 180°.

German document DE 25 25 939 describes a plasma arc torch, particularly for cutting or welding, wherein the electrode holder and the nozzle body form an exchangeable unit. The outer coolant supply is formed essentially through a clamping cap enclosing the nozzle body. The coolant flows via channels into an annular space, which is formed by the nozzle body and the clamping cap.

German document DE 692 33 071 T2 relates to a plasma arc cutting device. An embodiment of a nozzle is described therein for a plasma arc cutting torch, which nozzle is formed from a conductive material and comprises an outlet opening for a plasma gas beam and a hollow body section. Said body section is formed so that it has a generally conical, thin-walled configuration, which is inclined towards the outlet opening, and has an enlarged head section, which is formed integrally with the body section. The head section is thereby solid with the exception of a central channel, which is aligned with the outlet opening and has a generally conical outer surface, which is also inclined towards the outlet opening and has a diameter adjacent to that of the adjacent body section which exceeds the diameter of the body section, in order to form an undercut recess. The plasma arc cutting device has a secondary gas cap. A water cooled cap is arranged between the nozzle and the secondary gas cap in order to form a water cooled chamber for the outer surface of the nozzle for highly effective cooling. The nozzle is characterised by a large head, which surrounds an outlet opening for the plasma beam, and a sharp undercut or a recess to a conical body. This nozzle construction encourages the cooling of the nozzle.

In the plasma torches described above the coolant is supplied through a water supply channel to the nozzle and carried away from the nozzle by a water removal channel. These channels are mostly offset by 180° relative to each other and the coolant is intended to flow around the nozzle as evenly as possible on the way from the supply to the removal channel. Nonetheless, overheating in proximity to the nozzle channel is ascertained again and again.

Former East Germany document DD 83890 B1 describes another coolant guide for a torch, preferably a plasma torch, in particular for plasma welding, plasma cutting, plasma fusion and plasma spraying purposes, which withstands high thermal loads of the nozzle and the cathode. A coolant guide ring, which can be easily inserted into the nozzle holding part and easily removed from it, is provided for the cooling of the nozzle. Said coolant guide ring has, for the purpose of limitation of the coolant guide to a thin layer of maximum 3 mm in thickness, along the outer nozzle wall, a surrounding groove. Running into this surrounding groove are multiple cooling lines, preferably two to four in number, which are arranged in a star form radially thereto and symmetrically to the nozzle axis and in a star form in relation thereto at an angle of between 0 and 90°, such that the cooling lines are respectively adjacent two coolant outflows and each coolant outflow is adjacent to two coolant inflows.

However, such arrangement has the disadvantage that greater resources are necessary for the cooling through the use of an additional component, the coolant guide ring. In addition, such arrangement requires a larger construction.

SUMMARY

The invention allows overheating to be avoided in a plasma torch in the vicinity of the nozzle channel and the nozzle bore. This is achieved according to the invention through a plasma torch head, having a nozzle, a nozzle holder, and a nozzle cap, wherein the nozzle cap and the nozzle form a cooling liquid chamber which can be connected to a cooling liquid supply line and a cooling liquid return line via two bores offset respectively by 60° to 180°. The nozzle holder is formed such that the cooling liquid is conveyed virtually perpendicular to the longitudinal axis of the plasma torch head, contacting the nozzle, into the cooling liquid chamber and/or virtually perpendicular to the longitudinal axis out of the cooling liquid chamber into the nozzle holder.

The invention includes a nozzle including a nozzle bore for the exit of a plasma gas beam at a nozzle tip, a first section, of which the outer surface is essentially cylindrical, and a second section connecting thereto towards the nozzle tip, of which second section the outer surface tapers essentially conically towards the nozzle tip. At least one liquid supply groove can be provided to extend over a part of the first section and over the second section in the outer surface of the nozzle towards the nozzle tip and one liquid return groove separate from the liquid supply groove(s) can be provided to extend over the second section, or one liquid supply groove can be provided to extend over a part of the first section and over the second section in the outer surface of the nozzle towards the nozzle tip and at least one liquid return groove separate from the liquid supply groove can be provided to extend over the second section. "Essentially cylindrical" is contemplated to mean that the outer surface, at least without consideration of the grooves, such as liquid supply and return grooves, is more or less cylindrical. Similarly, "tapering essentially conically" is contemplated to mean that the outer surface, at least without consideration of the grooves, such as liquid supply and return grooves, tapers more or less conically.

The invention also provides a nozzle cap for a liquid cooled plasma torch, wherein the nozzle cap comprises an essentially conically tapering inner surface, characterised in that the inner surface of the nozzle cap comprises at least two recesses in a radial plane.

According to some embodiments of the invention, the nozzle of the plasma torch head comprises one or more cooling liquid supply groove(s) and the nozzle cap comprises on its inner surface at least two or three recesses of which the openings facing the nozzle respectively extend over an arc length ($b_2$), whereby the arc length of the regions of the nozzle adjacent in the circumferential direction to the cooling liquid supply groove(s) and outwardly projecting in relation to the cooling liquid supply groove(s) is respectively greater than the arc length (d4, e4). This avoids the need for a secondary connection from the coolant supply to the coolant return.

It can further be provided in the plasma torch head that the two bores each extend essentially parallel to the longitudinal axis of the plasma torch head. This reduces the amount of space necessary to connect cooling liquid lines to the plasma torch head. In some embodiments the bores for the cooling liquid supply can also be arranged offset in relation to the cooling liquid return by 180°.

The circular measure of the section between the recesses of the nozzle cap is advantageously as a maximum half the size of the minimum circular measure of the cooling liquid return groove or the minimum circular measure of the cooling liquid supply groove(s) of the nozzle. In some embodiments the liquid return groove(s) can also favourably extend over a part of the first section in the outer surface of the nozzle.

In some embodiments at least two liquid supply grooves are provided. Some embodiments provide at least two liquid return grooves. Some embodiments also allow the middle point of the liquid supply groove and the middle point of the liquid return groove to be arranged offset by 180° to each other around the circumference of the nozzle. In the resulting configuration, the liquid supply groove and the liquid return groove lie opposite each other.

It is contemplated the width of the liquid return groove and the width of the liquid supply groove can lie in the circumferential direction in the range of from about 90° to 270°. Such a particularly wide liquid return/supply groove allows for enhanced cooling of the nozzle. It is further contemplated that a groove can be disposed in the first section, the groove being in connection with the liquid supply groove. In some embodiments a groove can be disposed in the first section, the groove being in connection with the liquid return groove.

It is also contemplated the groove can extend in the circumferential direction of the first section of the nozzle around the whole circumference. It is contemplated the groove can extend in the circumferential direction of the first section of the nozzle over an angle from about 60° to 300°, and the groove can also extend in the circumferential direction of the first section of the nozzle over an angle in the range from about 60° to 300°. It is further contemplated the groove can extend in the circumferential direction of the first section of the nozzle over an angle in the range from about 90° to 270°. The groove can also extend in the circumferential direction of the first section of the nozzle over an angle in the range from about 90° to 270°.

In one contemplated embodiment, two liquid supply grooves are provided. In a further embodiment, precisely two liquid return grooves are provided.

The two liquid supply grooves can be arranged around the circumference of the nozzle symmetrically to a straight line extending from the middle point of the liquid return groove at a right angle through the longitudinal axis of the nozzle. The two liquid return grooves can be arranged around the circumference of the nozzle symmetrically to a straight line extending from the middle point of the liquid supply groove at a right angle through the longitudinal axis of the nozzle.

The middle points of the two liquid supply grooves and/or the middle points of the two liquid return grooves can be arranged offset by an angle in relation to each other around the circumference of the nozzle, which angle lies between about 30° and 180°. The width of the liquid return groove and/or the width of the liquid supply groove can lie in the circumferential direction in the range from about 120° to 270°.

It is also contemplated the two liquid supply grooves can be connected to each other in the first section of the nozzle and/or the two liquid return grooves can be connected to each other in the first section of the nozzle. The two liquid supply grooves can also be connected to each other in the first section of the nozzle by a groove. The two liquid return grooves can also be connected to each other in the first section of the nozzle by a groove.

In some embodiments, the groove can extend beyond one or both liquid supply grooves. The groove can also extend beyond one or both liquid return grooves. In some embodiments, the groove can extend in the circumferential direction of the first section of the nozzle around the whole circumference. The groove can also extend in the circumferential direction of the first section of the nozzle over an angle in the range from about 60° to 300°. It is contemplated the groove can extend in the circumferential direction of the first section of the nozzle over an angle in the range from about 90° to 270°.

By supplying and/or removing the cooling liquid at a right angle to the longitudinal axis of the plasma torch head instead of—as in the prior art—parallel to the longitudinal axis of the plasma torch head, improved cooling of the nozzle is achieved through longer contact of the cooling liquid with the nozzle.

If more than one cooling liquid supply groove is provided, enhanced vorticity of the cooling liquid can thus be achieved in the region of the nozzle tip through the convergence of the liquid flows, which also tends to enhance cooling of the nozzle.

BRIEF DESCRIPTION OF THE DRAWINGS

Further features and advantages of the invention follow from the attached claims and the following description, in which several embodiments are explained individually by reference to the schematic drawings, in which:

DETAILED DESCRIPTION

In the following description, embodiments are shown which comprise at least one liquid supply groove, referred to here as a cooling liquid supply groove, and one liquid return groove, referred to here as a cooling liquid return groove. However, the invention is not limited to any particular number of liquid supply grooves and liquid return grooves, and it is contemplated that the number of liquid supply and return grooves will vary considerably for different embodiments within the intended invention scope.

Figure 1:
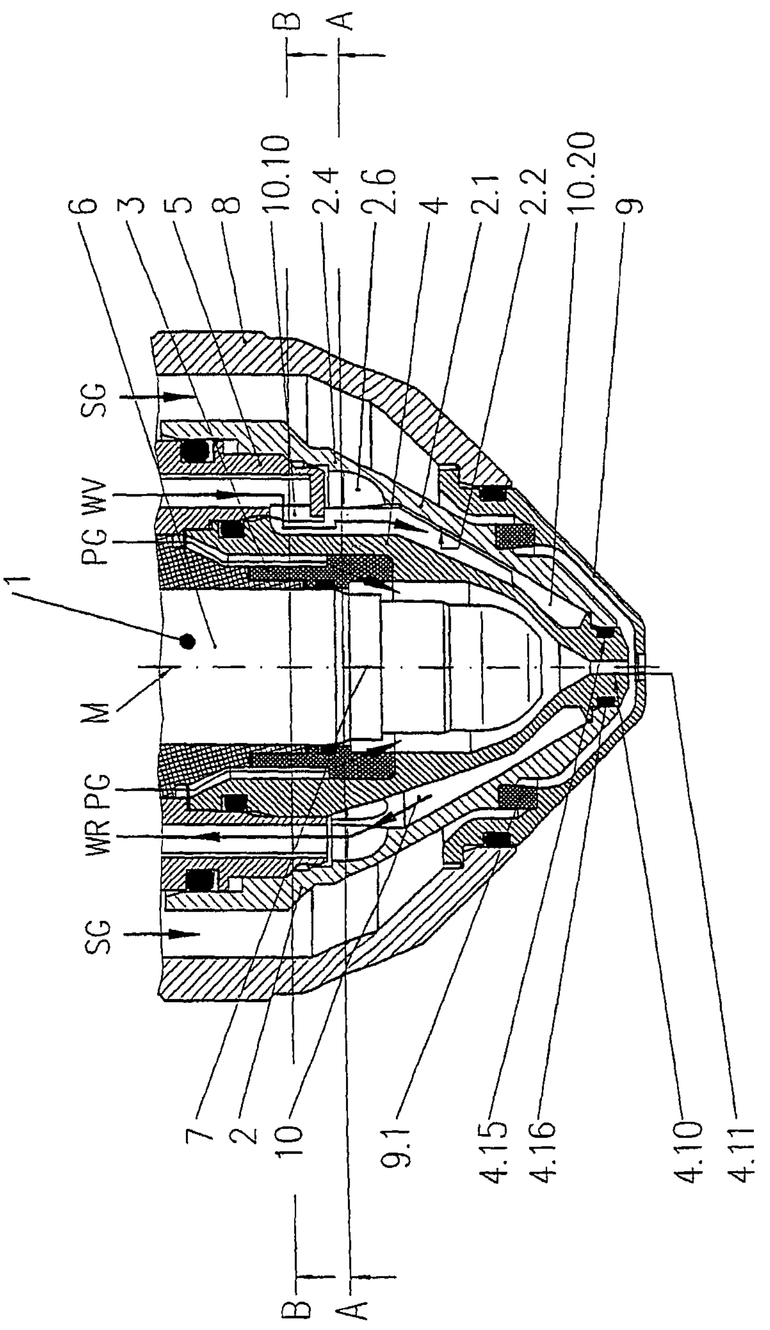
FIG. 1 depicts a longitudinal sectional view through a plasma torch head with plasma and secondary gas supply with a nozzle and a nozzle cap according to one embodiment of the invention.

Referring to FIG. 1, a plasma torch head receives an electrode 7 with an electrode receiving element 6, in the present case via a thread (not shown). The electrode is formed as a flat electrode. Air or oxygen for example can be used as plasma gas (PG) for the plasma torch. A nozzle 4 is received by an essentially cylindrical nozzle holder 5. A nozzle cap 2, which is fixed by means of a thread (not shown) to the plasma torch head 1, fixes the nozzle 4 to form a cooling liquid chamber 10. The cooling liquid chamber 10 is sealed by a seal realized with an o-ring 4.16, which is disposed in a groove 4.15 of the nozzle 4, between the nozzle 4 and the nozzle cap 2. A cooling liquid, e.g. water or water with anti-freeze, flows through the cooling liquid chamber 10 from a bore of the cooling liquid supply WV to a bore of the cooling liquid return WR, whereby the bores are arranged offset by 180° relative to each other.

In prior art plasma torches, overheating of the nozzle 4 tends to occur frequently in the region of the nozzle bore 4.10. However, overheating can also arise between the cylindrical section of the nozzle 4 and the nozzle holder 5. This is particularly true for plasma torches operated with a high pilot current or indirectly. This problem also tends to manifest itself by discoloration of the copper after a short operating time. For example, at currents of 40 A, discoloration can occur in as little as 5 minutes. Likewise the sealing point between the nozzle 4 and the nozzle cap 2 can be overloaded, which can lead to damage to the o-ring 4.6 and thus to interference with sealing and cooling liquid escaping. This effect has been observed to occur particularly on the side of the nozzle 4 facing the cooling liquid return. It is assumed that the region subject to the highest thermal load, the nozzle bore 4.10 of the nozzle 4, is inadequately cooled because the cooling liquid flows insufficiently through the part 10.20 of the cooling liquid chamber 10 lying closest to the nozzle bore and/or does not even reach this part 10.20, particularly on the side facing the cooling liquid return.

Referring to the plasma torch of the invention in FIG. 1, cooling is conveyed virtually perpendicular to the longitudinal axis of the plasma torch head 1 from the nozzle holder 5, contacting the nozzle 4, into the cooling liquid chamber 10. The cooling liquid is deflected in a deflection area 10.10 of the cooling liquid chamber 10 from the direction parallel to the longitudinal axis in the bore of the cooling liquid supply WV of the plasma torch in the direction of a first nozzle section 4.1 (see FIG. 2) virtually perpendicular to the longitudinal axis of the plasma torch head 1. The cooling liquid then flows through the area 10.11 formed by a cooling liquid supply groove 4.20 (see FIGS. 1*a*, 1*b* and 2) of the nozzle 4 and the nozzle cap 2 into the region 10.20 of the cooling liquid chamber 10 surrounding the nozzle bore 4.10 and flows around the nozzle 4. The cooling liquid then flows through an area 10.15 formed by a cooling liquid return groove 4.22 of the nozzle 4 and the nozzle cap 2 back to the cooling liquid return WV, whereby the transition takes place essentially parallel to the longitudinal axis of the plasma torch head.

The plasma torch head 1 is equipped with a nozzle protection cap holder 8 and a nozzle protection cap 9. The secondary gas SG which surrounds the plasma beam flows through this region. The secondary gas SG flows through a secondary gas guide element 9.1 and can thereby be set in rotation.

Figure 1A:
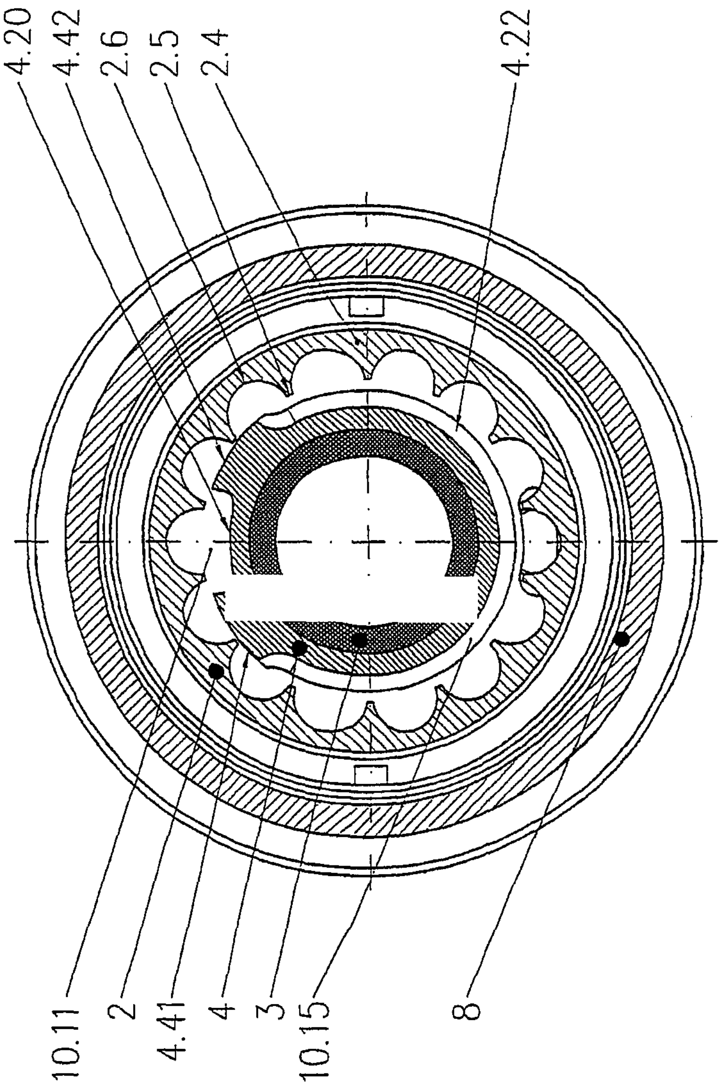
FIG. 1*a* depicts a sectional representation along the line A-A of FIG. 1.

FIG. 1*a* shows a sectional representation along the line A-A of the plasma torch of FIG. 1. It shows how the area formed by the cooling liquid supply groove 4.20 of the nozzle 4 and the nozzle cap 2 prevent, through sections 4.41 and 4.42 of projecting regions 4.31 and 4.32 of the nozzle in combination with the inner surface 2.5 of the nozzle cap 2, a secondary connection between the cooling liquid supply and cooling liquid return. In order to ensure that the secondary connection of the cooling liquid is prevented in each position of the nozzle 4 relative to the nozzle cap 2 the circular measures d4 and e4 of the sections 4.41 and 4.42 of the projecting regions 4.31 and 4.32 of the nozzle 4 (circular projection measure) must be at least as large as the circular measure b2 of recesses 2.6 (circular recess measure), facing the nozzle, of the nozzle cap 2 (see FIGS. 14 to 16).

This configuration allows for effective cooling of the nozzle 4 in the region of the nozzle tip and prevents thermal overload. The configuration also ensures that as much cooling liquid as possible reaches the area 10.20 of the cooling liquid chamber 10. The configuration has also been observed to prevent discoloration of the nozzle in the region of the nozzle bore 4.10 and further observed to prevent problems in the sealing between the nozzle 4 and the nozzle cap 2 and overheating of the O-ring.

Figure 1B:
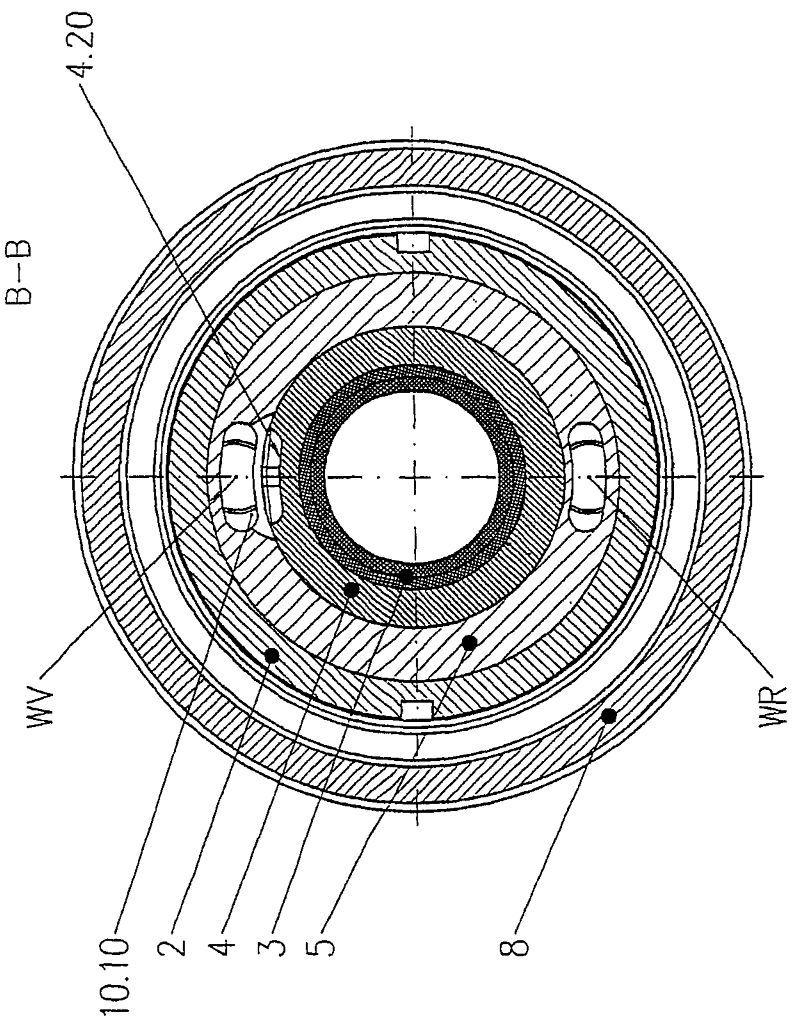
FIG. 1*b* depicts a sectional representation along the line B-B of FIG. 1.

FIG. 1*b* shows a sectional representation along the line B of the plasma torch head of FIG. 1, which shows the plane of the deflection area 10.10.

Figure 2:
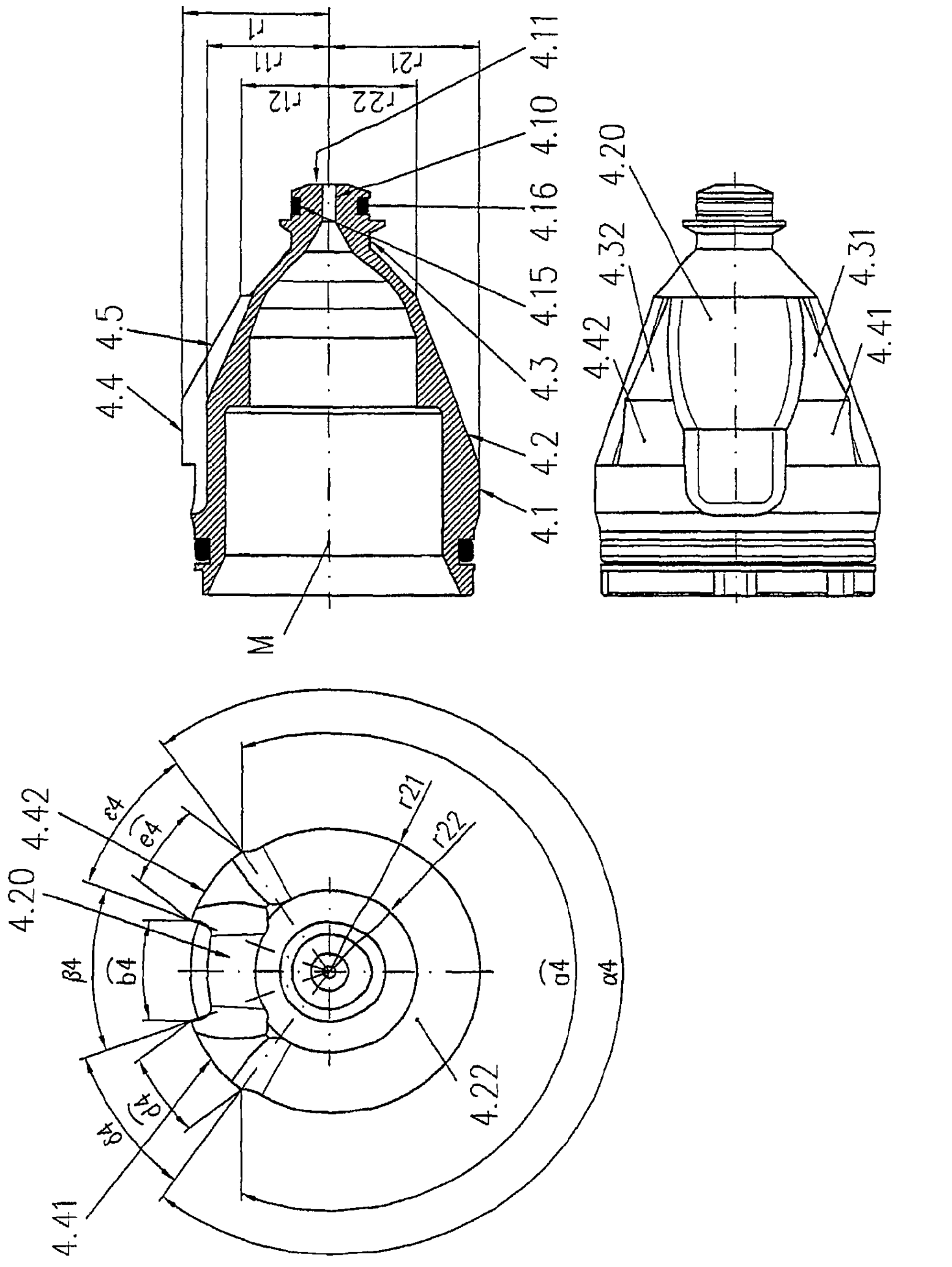
FIG. 2 depicts individual representations (top left: top view from the front; top right: longitudinal sectional view; bottom right: side view) of the nozzle of FIG. 1.

FIG. 2 shows the nozzle 4 of the plasma torch head of FIG. 1, depicting a nozzle bore 4.10 for the exit of a plasma gas beam at a nozzle tip 4.11, a first section 4.1, of which the outer surface 4.4 is essentially cylindrical, and a second section 4.2 connecting thereto towards the nozzle tip 4.11, of which second section 4.2 the outer surface 4.5 tapers essentially conically towards the nozzle tip 4.11. The cooling liquid supply groove 4.20 extends over a part of the first section 4.1 and over the second section 4.2 in the outer surface 4.5 of the nozzle 4 towards the nozzle tip 4.11 and ends before the cylindrical outer face 4.3. The cooling liquid return groove 4.22 extends over the second section 4.2 of the nozzle 4. The middle point of the cooling liquid supply groove 4.20 and the middle point of the cooling liquid return groove (4.22) are arranged offset relative to each other around the circumference of the nozzle (4). The alpha width 4 of the cooling liquid return groove 4.22 in the circumferential direction is around 250°. The outwardly projecting regions 4.31 and 4.32 with the associated sections 4.41 and 4.42 are disposed between the cooling liquid supply groove 4.20 and the cooling liquid return groove 4.22.

Figure 3:
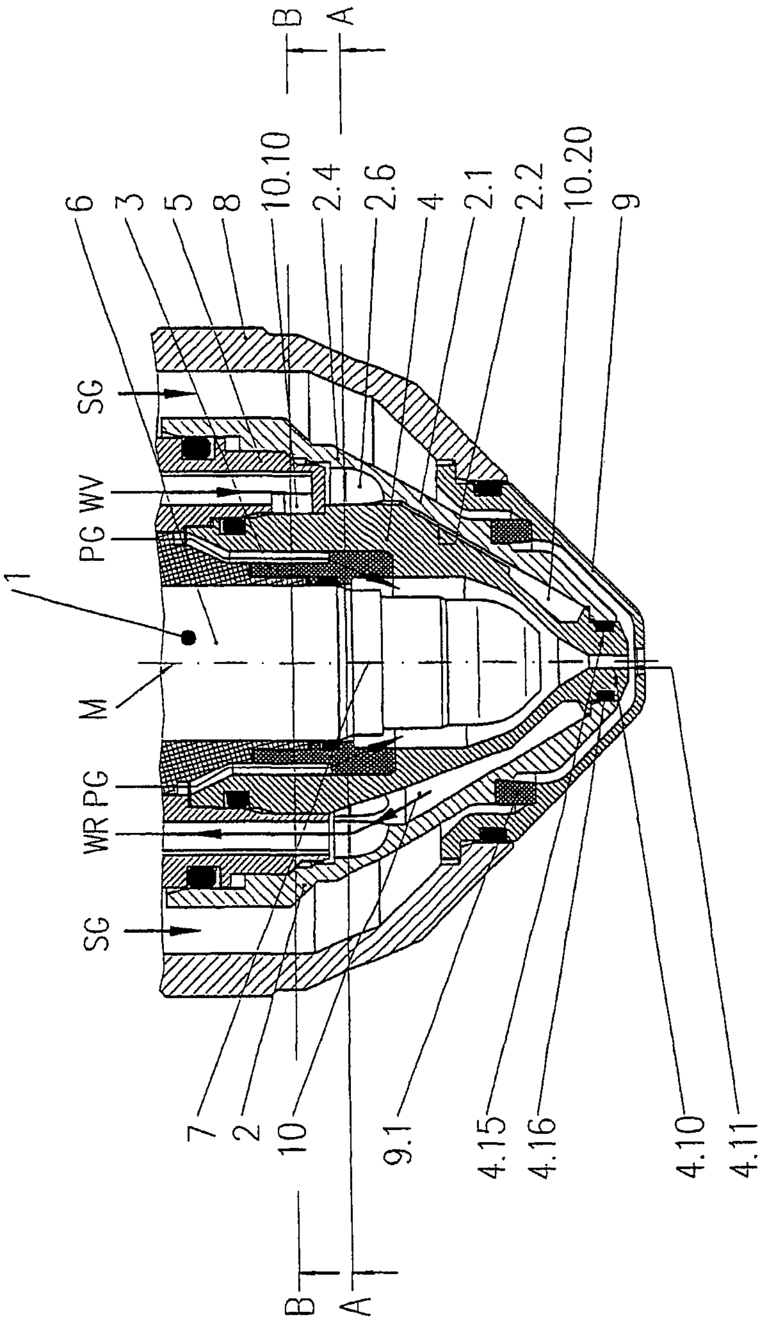
FIG. 3 depicts a longitudinal sectional view through a plasma torch head with plasma and secondary gas supply with a nozzle and a nozzle cap according to one embodiment of the invention.

FIG. 3 shows a plasma torch similar to FIG. 1, but according to a further particular embodiment. The nozzle 4 has two cooling liquid supply grooves 4.20 and 4.21. The cooling liquid is conveyed virtually perpendicular to the longitudinal axis of the plasma torch head 1 from the nozzle holder 5, contacting the nozzle 4, into the cooling liquid chamber 10. The cooling liquid is deflected in the deflection area 10.10 of the cooling liquid chamber 10 from the direction parallel to the longitudinal axis in the bore of the cooling liquid supply WV of the plasma torch in the direction of the first nozzle section 4.1 virtually perpendicular to the longitudinal axis of the plasma torch head 1. The cooling liquid then flows through a groove 5.1 of the nozzle holder 5 into the two areas 10.11 and 10.12 formed by the cooling liquid supply grooves 4.20 and 4.21 of the nozzle 4 and the nozzle cap 2 to the region 10.20 of the cooling liquid chamber 10 surrounding the nozzle bore 4.10, and flows around the nozzle 4. The cooling liquid then flows through the area 10.15 formed by the cooling liquid return groove 4.22 of the nozzle 4 and the nozzle cap 2 back to the cooling liquid return WR, whereby the transition takes place essentially parallel to the longitudinal axis of the plasma torch head.

Figure 3A:
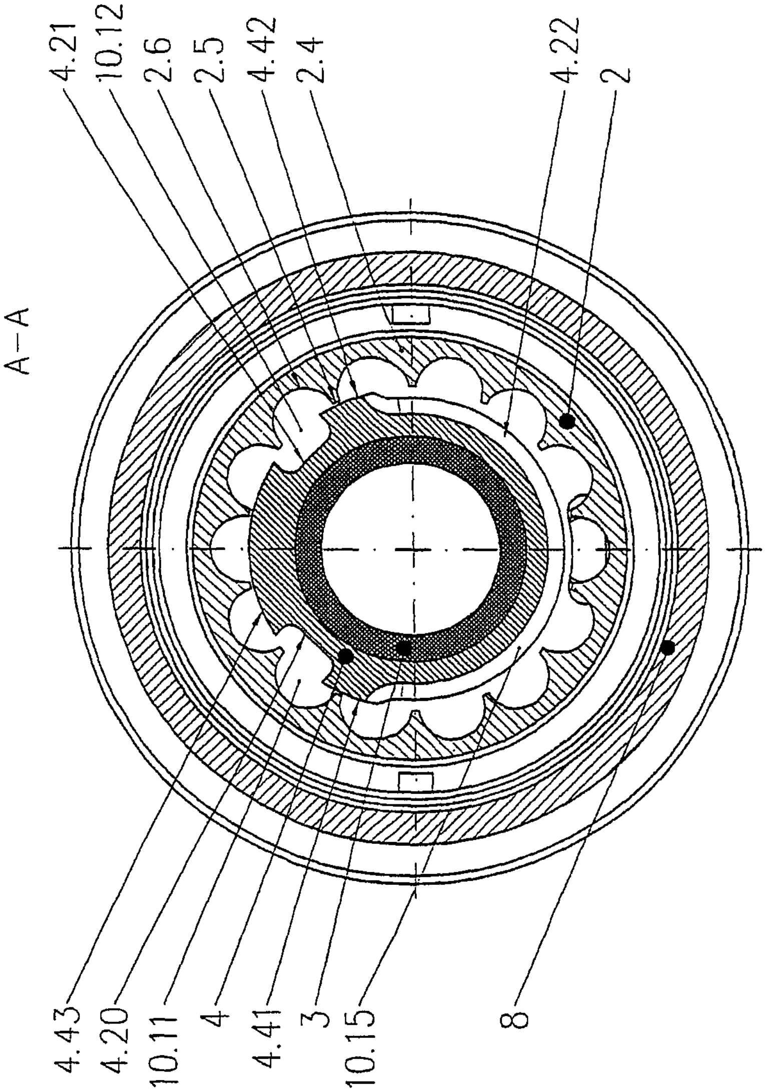
FIG. 3*a* depicts a sectional representation along the line A-A of FIG. 3.

FIG. 3*a* shows a sectional representation along the line A-A of the plasma torch of FIG. 3. It shows how the areas 10.11 and 10.12 formed by the cooling liquid supply grooves 4.20 and 4.21 of the nozzle 4 and the nozzle cap 2 prevent, through sections 4.41 and 4.42 of the projecting regions 4.31 and 4.32 of the nozzle 4 in combination with the inner surface 2.5 of the nozzle cap 2, a secondary connection between the cooling liquid supply and the cooling liquid return. At the same time a secondary connection between the areas 10.11 and 10.12 is prevented by the section 4.43 of the projecting region 4.33. In order to ensure that in each position of the nozzle 4 relative to the nozzle cap 2 the secondary connection of the cooling liquid is prevented, the circular measures of d4 and e4 of the sections 4.41 and 4.42 of the nozzle 4 must be at least as large as the circular measure b2 of recesses 2.6, facing the nozzle, of the nozzle cap 2 (see FIGS. 14 to 16).

Figure 3B:
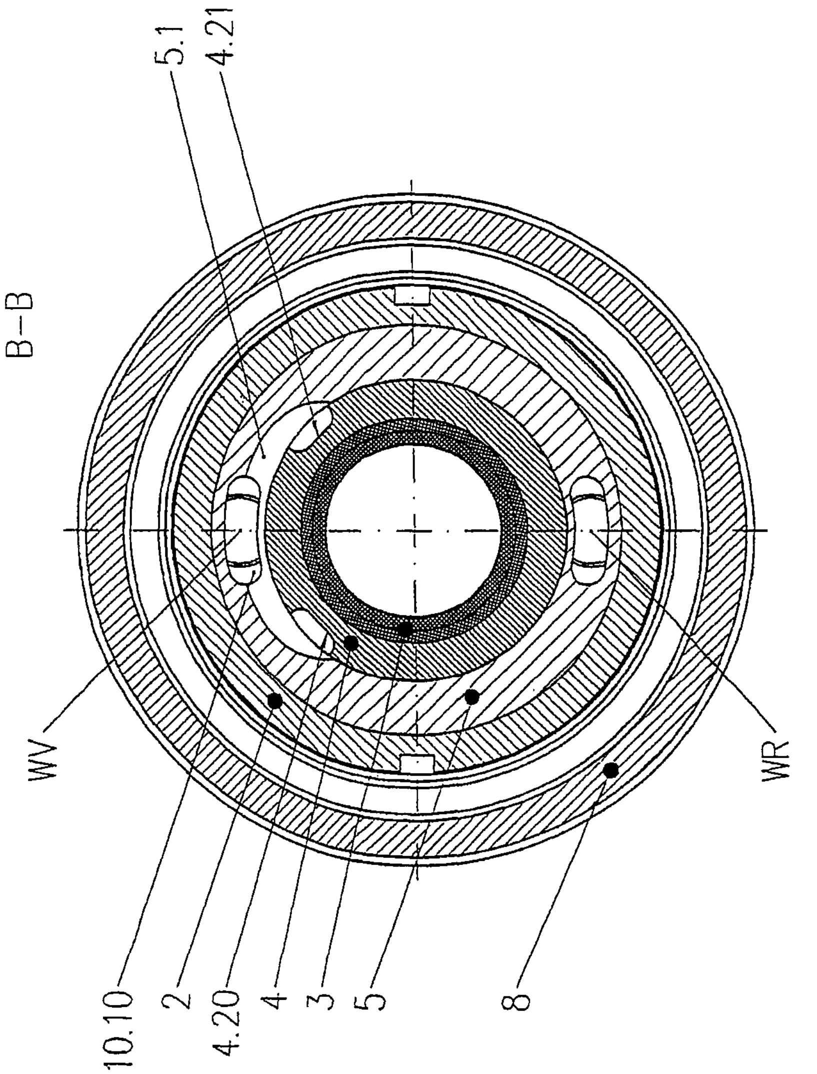
FIG. 3*b* depicts a sectional representation along the line B-B of FIG. 3.

FIG. 3*b* is a sectional illustration along the line B-B of the plasma torch of FIG. 3. It shows the plane of the deflection area 10.10 and the connection with the two cooling liquid supplies 4.20 and 4.21 through the groove 5.1 in the nozzle holder 5.

Figure 4:
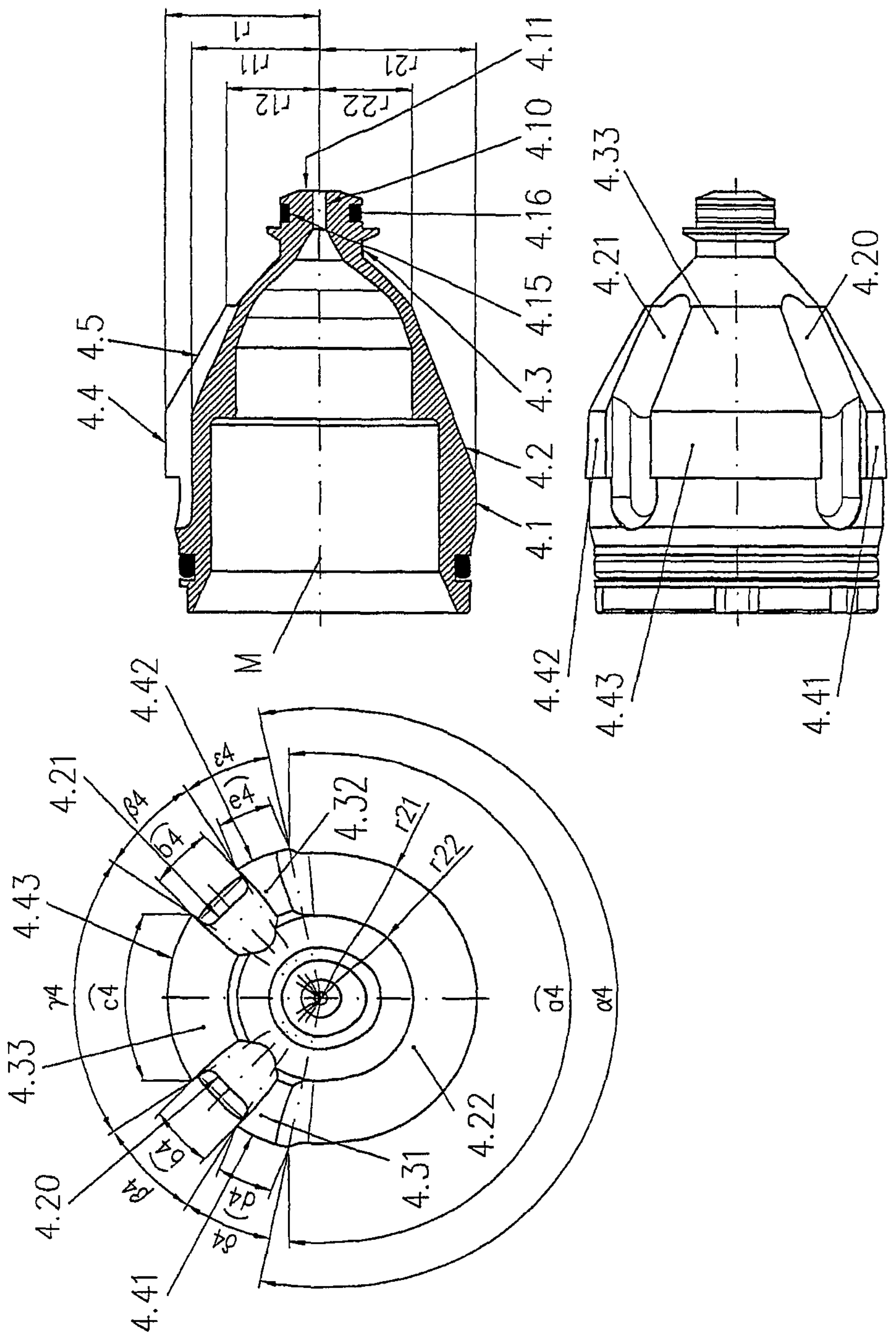
FIG. 4 depicts individual representations (top let: top view from the front; top right: longitudinal sectional view; bottom right: side view) of the nozzle of FIG. 3.

FIG. 4 shows the nozzle 4 of the plasma torch head of FIG. 3. A nozzle bore 4.10 is positioned for the exit of a plasma gas beam at a nozzle tip 4.11, a first section 4.1, of which the outer surface 4.4 is essentially cylindrical, and a second section 4.2 connecting thereto towards the nozzle tip 4.11, of which second section 4.2 the outer surface 4.5 tapers essentially conically towards the nozzle tip 4.11. The cooling liquid supply grooves 4.20 and 4.21 extend over a part of the first section 4.1 and over the second section 4.2 in the outer surface 4.5 of the nozzle 4 towards the nozzle tip 4.11 and end before the cylindrical outer face 4.3. The cooling liquid return groove 4.22 extends over the second section 4.2 of the nozzle 4. The alpha width 4 of the cooling liquid return groove 4.22 in the circumferential direction is around 190°. The outwardly projecting regions 4.31; 4.32 and 4.33 with the associated sections 4.41; 4.42 and 4.43 are disposed between the cooling liquid supply grooves 4.20; 4.21 and the cooling liquid return groove 4.22.

Figure 5:
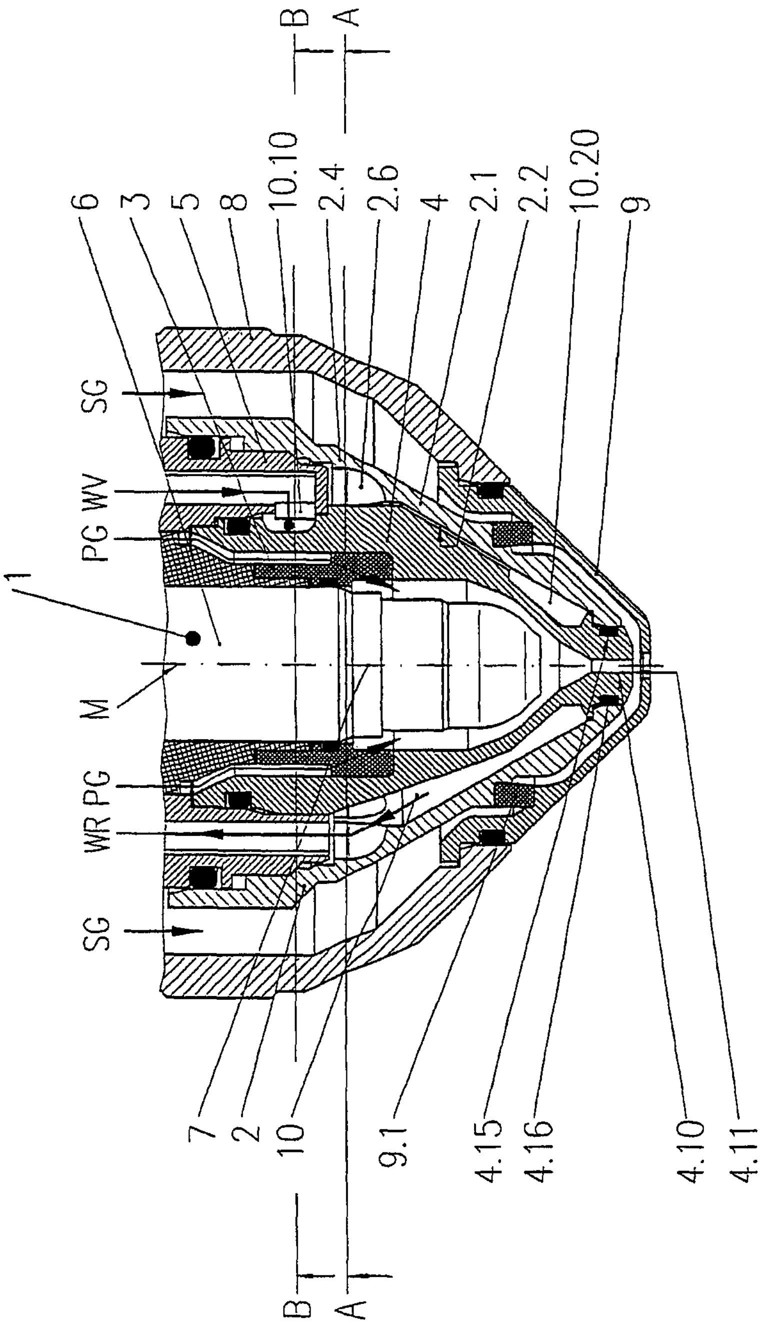
FIG. 5 depicts a longitudinal sectional view through a plasma torch head with plasma and secondary gas supply with a nozzle and a nozzle cap according to one embodiment of the invention.

FIG. 5 shows an embodiment plasma torch of the invention similar to FIG. 3. The nozzle 4 has two cooling liquid supply grooves 4.20 and 4.21 (see FIG. 5*a*). The cooling liquid is conveyed virtually perpendicular to the longitudinal axis of the plasma torch head 1 from the nozzle holder 5, contacting the nozzle 4, into the cooling liquid chamber 10. The cooling liquid is deflected in the deflection area 10.10 of the cooling liquid chamber 10 from the direction parallel to the longitudinal axis in the bore of the cooling liquid supply WV of the plasma torch in the direction of the first nozzle section 4.1 virtually perpendicular to the longitudinal axis of the plasma torch head 1. The cooling liquid then flows through a groove 4.6 of the nozzle 4 into the two areas 10.11 and 10.12 formed by the cooling liquid supply grooves 4.20 and 4.21 of the nozzle 4 and the nozzle cap 2 to the region 10.20 of the cooling liquid chamber 10 surrounding the nozzle bore 4.10, and flows around the nozzle 4. The cooling liquid then flows through the area 10.15 formed by the cooling liquid return groove 4.22 of the nozzle 4 and the nozzle cap 2 back to the cooling liquid return WR, whereby the transition takes place essentially parallel to the longitudinal axis of the plasma torch head.

Figure 5A:
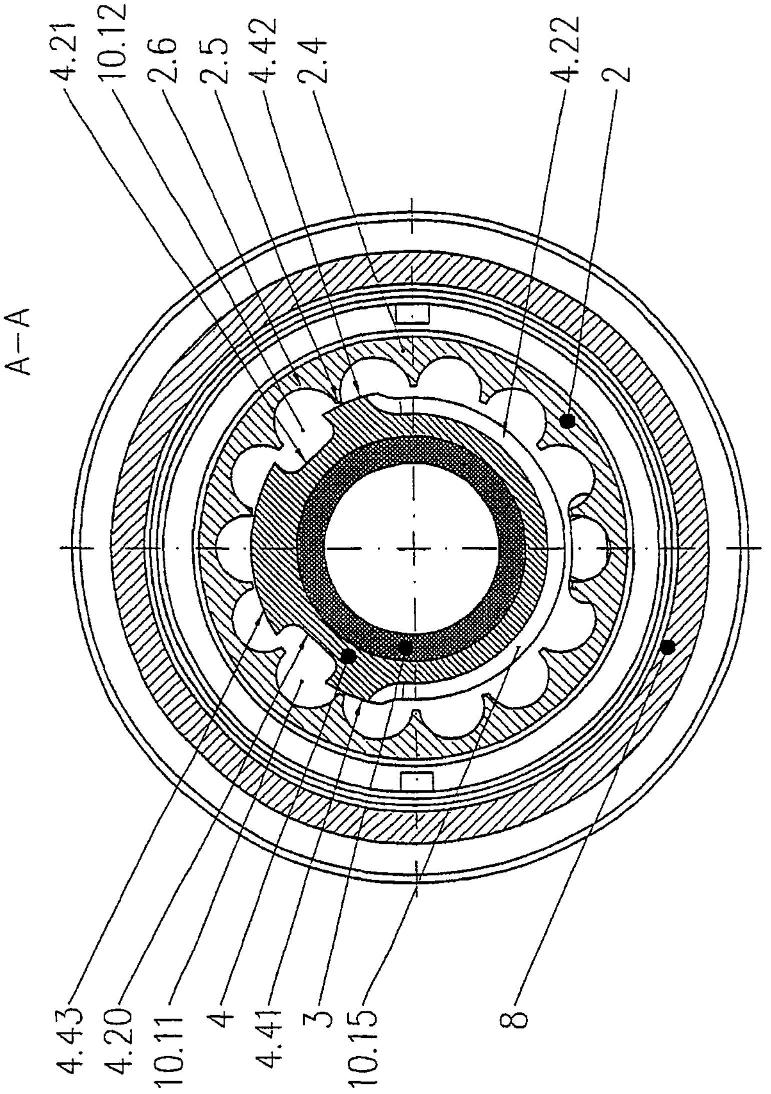
FIG. 5*a* depicts a sectional representation along the line A-A of FIG. 5; depicts

FIG. 5*a* shows a sectional representation along the line A-A of the plasma torch of FIG. 5. Areas 10.11 and 10.12 are formed by the cooling liquid supply grooves 4.20 and 4.21 of the nozzle 4 and the nozzle cap 2 and prevent, through the sections 4.41 and 4.42 of the projecting regions 4.31 and 4.32 of the nozzle 4 in combination with the inner surface 2.5 of the nozzle cap 2, a secondary connection between the cooling liquid supply and the cooling liquid return. A secondary connection between the areas 10.11 and 10.12 is prevented through the section 4.43 of the projecting region 4.33. In order to ensure that the secondary connection of the cooling liquid is prevented in each position of the nozzle 4 relative to the nozzle cap 2, the circular measures d4 and e4 of the sections 4.41 and 4.42 of the nozzle 4 must be at least as large as the circular measure b2 of recesses 2.6, facing the nozzle, of the nozzle cap 2.

Figure 5B:
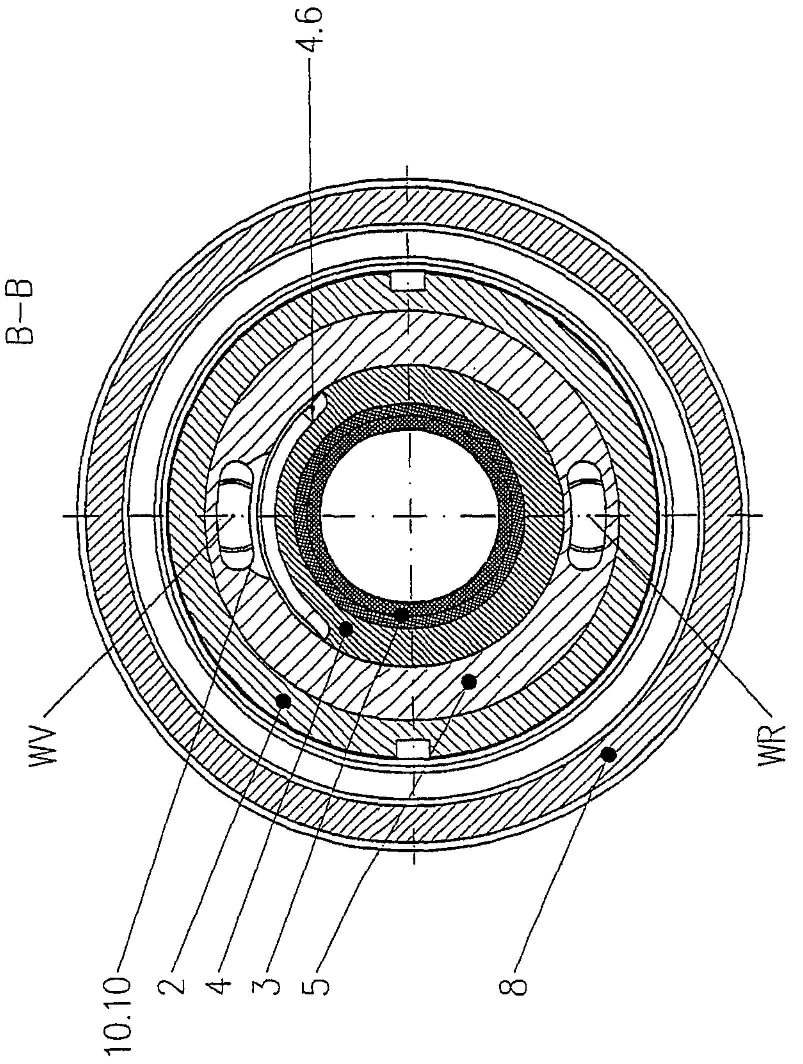
FIG. 5*b* depicts a sectional representation along the line B-B of FIG. 5.

FIG. 5*b* is a sectional illustration along the line B-B of the plasma torch of FIG. 5. It shows the plane of the deflection area 10.10 and the connection with the two cooling liquid supplies through the groove 4.6 in the nozzle 4.

Figure 6:
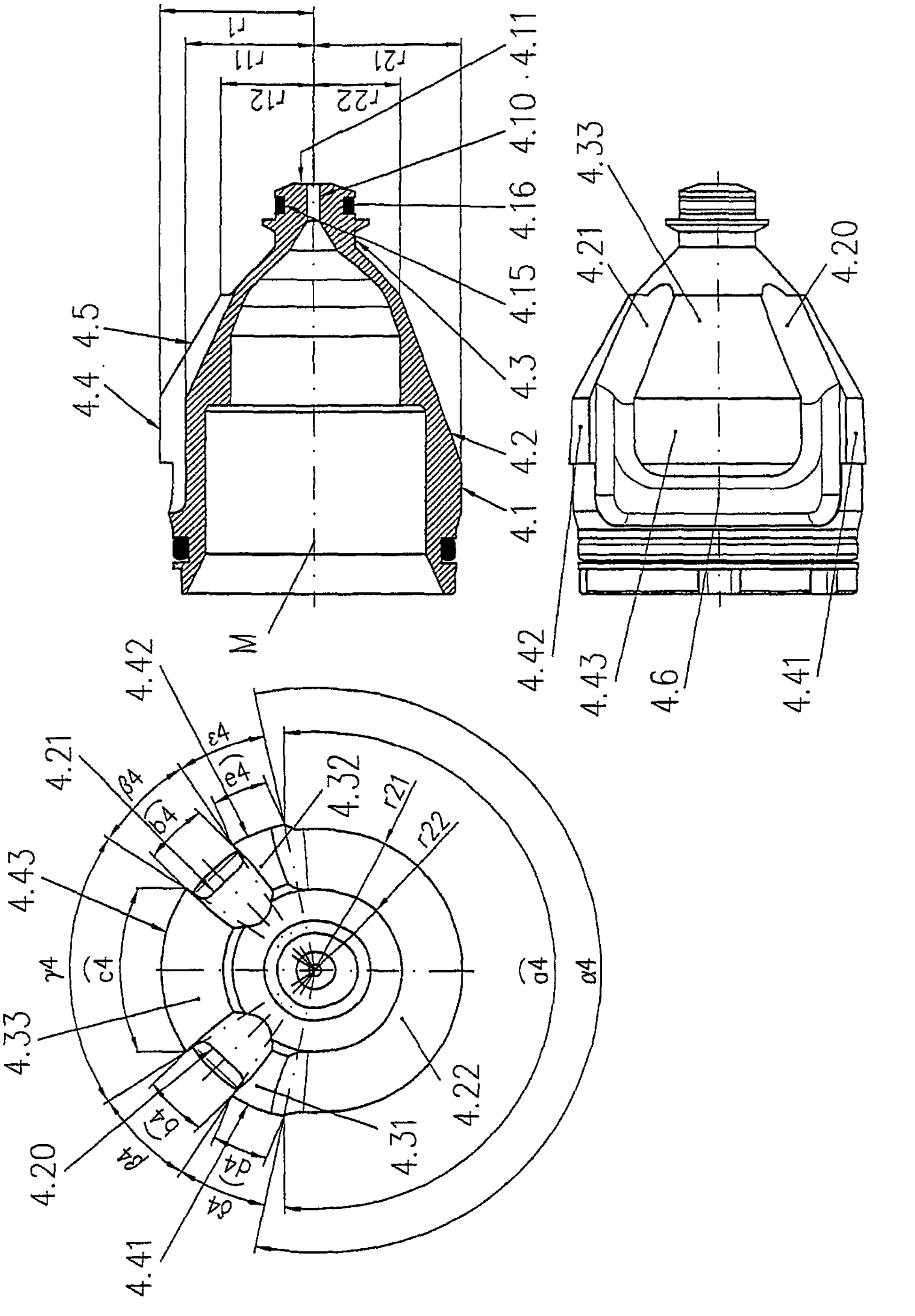
FIG. 6 depicts individual representations (top left: top view from the front; top right: longitudinal sectional view; bottom right: side view) of the nozzle of FIG. 5.

FIG. 6 shows the nozzle 4 of the plasma torch head of FIG. 5. A nozzle bore 4.10 is positioned for the exit of the plasma gas beam at a nozzle tip 4.11, a first section 4.1, of which the outer surface 4.4 is essentially cylindrical, and a second section 4.2 connecting thereto towards the nozzle tip 4.11, of which second section 4.2 the outer surface 4.5 tapers essentially conically towards the nozzle tip 4.11. The cooling liquid supply grooves 4.20 and 4.21 extend over a part of the first section 4.1 and over the second section 4.2 in the outer surface 4.5 of the nozzle 4 towards the nozzle tip 4.11 and end before the cylindrical outer surface 4.3. The cooling liquid return groove 4.22 extends over the second section 4.2 of the nozzle 4.

The alpha width 4 of the cooling liquid return groove 4.22 in the circumferential direction is approximately 190°. Disposed between the cooling liquid grooves 4.20; 4.21 and the cooling liquid return groove 4.22 are the outwardly projecting regions 4.31; 4.32 and 4.33 with the associated sections 4.41; 4.42 and 4.43. The cooling liquid supply grooves 4.20 and 4.21 are connected to each other by the groove 4.6 of the nozzle.

Figure 7:
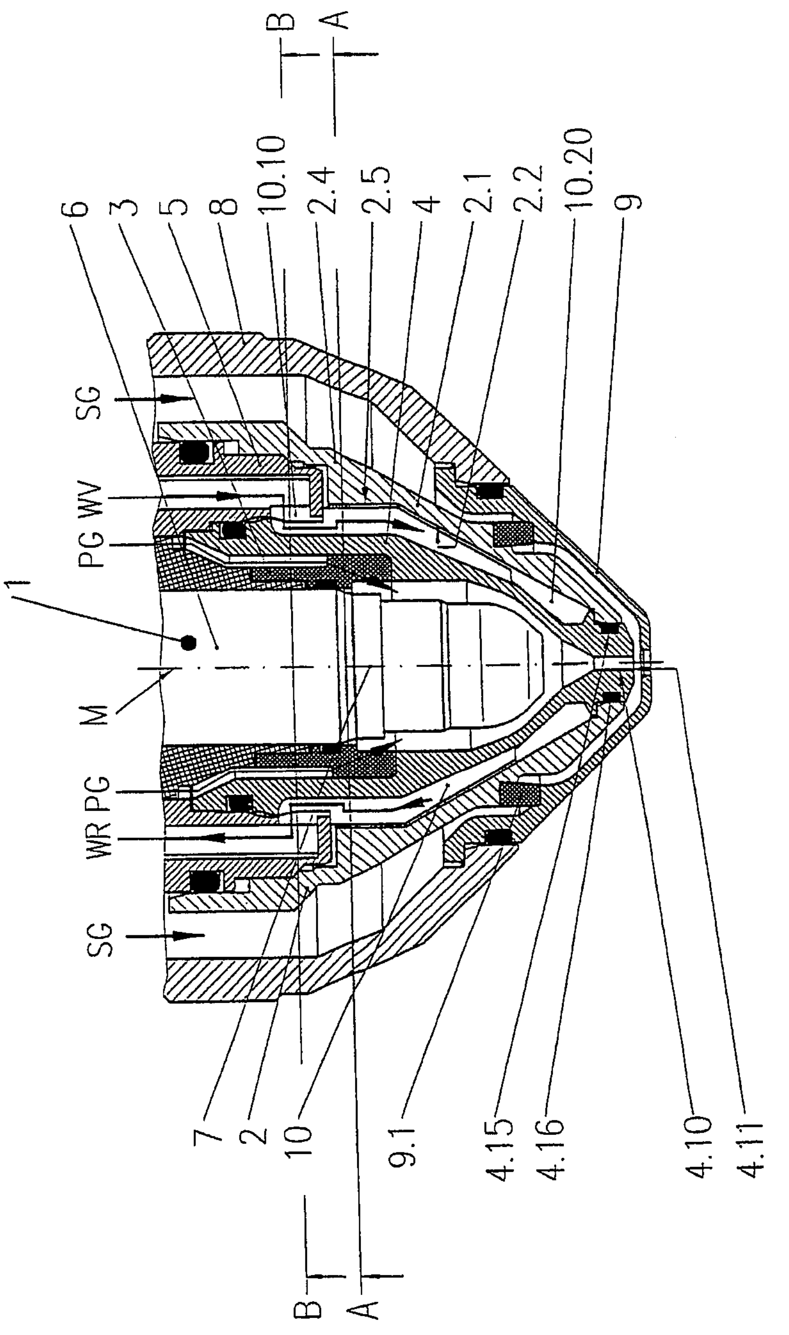
FIG. 7 depicts a longitudinal sectional view through a plasma torch head with plasma and secondary gas supply with a nozzle according to one embodiment of the invention.

FIG. 7 shows an embodiment plasma torch head according to one contemplated embodiment of the invention. The cooling liquid is conveyed virtually perpendicular to the longitudinal axis of the plasma torch head 1 from a nozzle holder 5, contacting the nozzle 4, into a cooling liquid chamber 10. The cooling liquid is deflected in the deflection area 10.10 of the cooling liquid chamber 10 from the direction parallel to the longitudinal axis in the bore of the cooling liquid supply WV of the plasma torch in the direction of the first nozzle section 4.1 virtually perpendicular to the longitudinal axis of the plasma torch head 1. The cooling liquid then flows through an area 10.11 (see FIG. 7*a*) formed by a cooling liquid supply groove 4.20 of the nozzle 4 and the nozzle cap 2 (see FIG. 7*a*) into the region 10.20 of the cooling liquid chamber 10 surrounding the nozzle bore 4.10, and flows around the nozzle 4. The cooling liquid then flows through an area 10.15 formed by a cooling liquid return groove 4.22 of the nozzle 4 and the nozzle cap 2 back to the cooling liquid return WR, whereby the transition takes place virtually perpendicular to the longitudinal axis of the plasma torch head, through a deflection area 10.10.

Figure 7A:
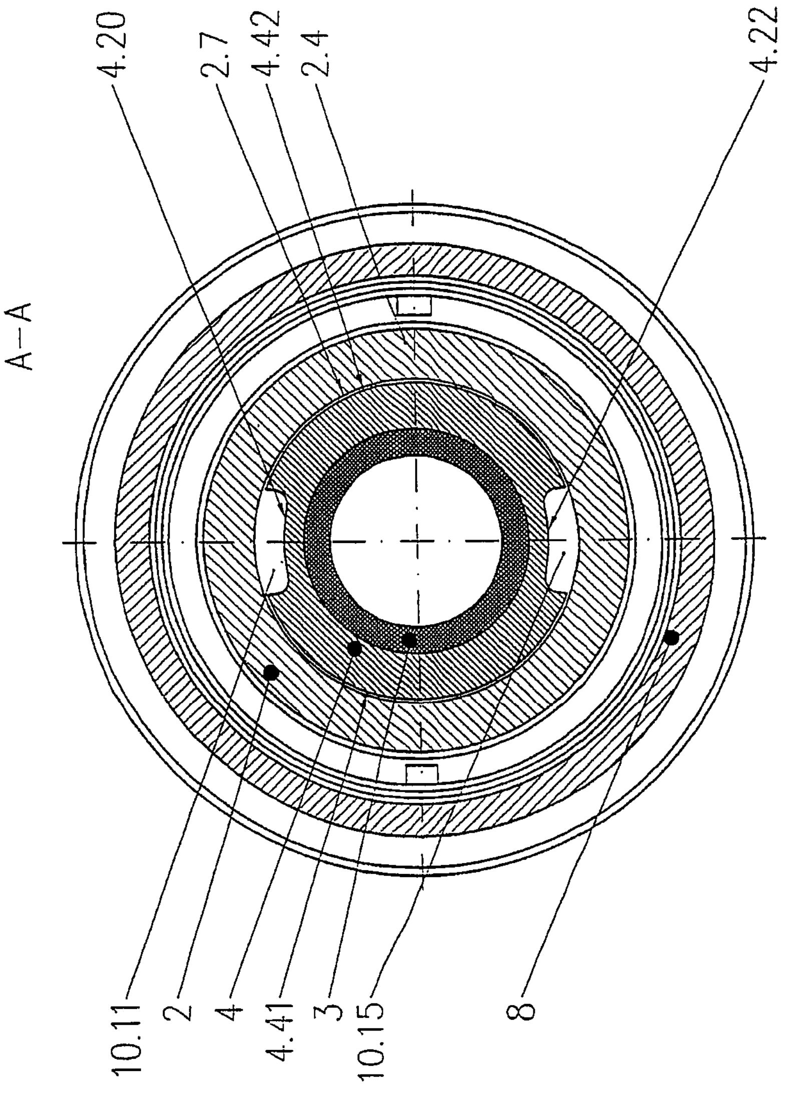
FIG. 7*a* depicts a sectional representation along the line A-A of FIG. 7.

FIG. 7*a* shows a sectional representation along the line A-A of the plasma torch of FIG. 7. Area 10.11 is formed by the cooling liquid supply groove 4.20 of the nozzle 4 and the nozzle cap 2 to prevent, through sections 4.41 and 4.42 of the projecting regions 4.31 and 4.32 of the nozzle 4 in combination with the inner surface of the nozzle cap 2, a secondary connection between the cooling liquid supply and the cooling liquid return.

Figure 7B:
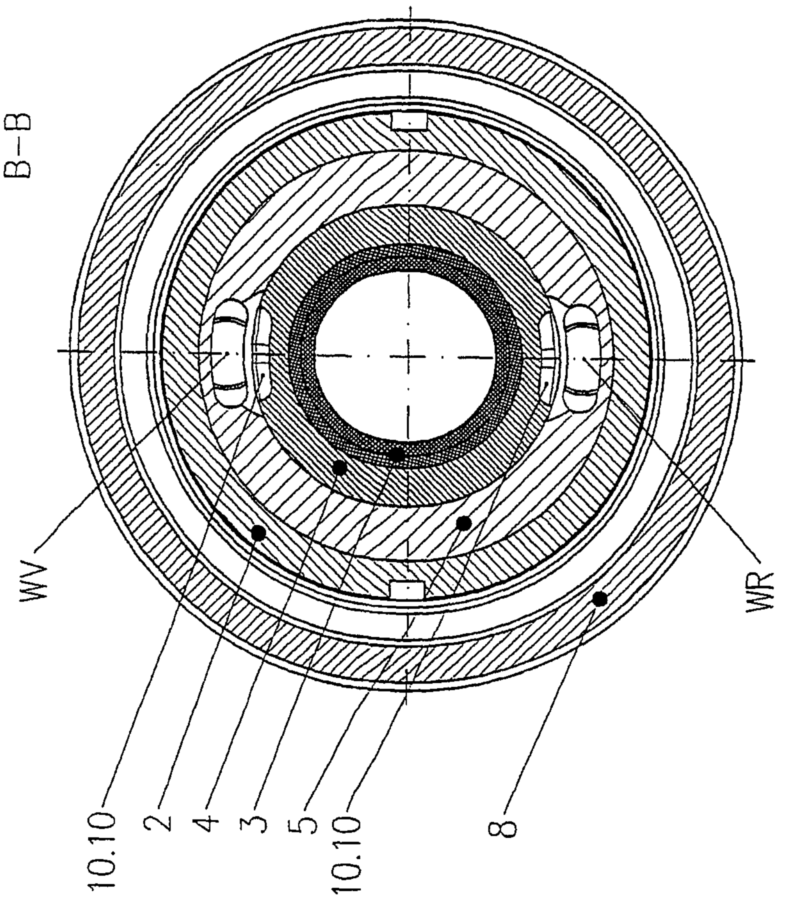
FIG. 7*b* depicts a sectional representation along the line B-B of FIG. 7.

FIG. 7*b* shows a sectional illustration along the line B-B of the plasma torch head of FIG. 7, which shows the plane of the deflection areas 10.10.

Figure 8:
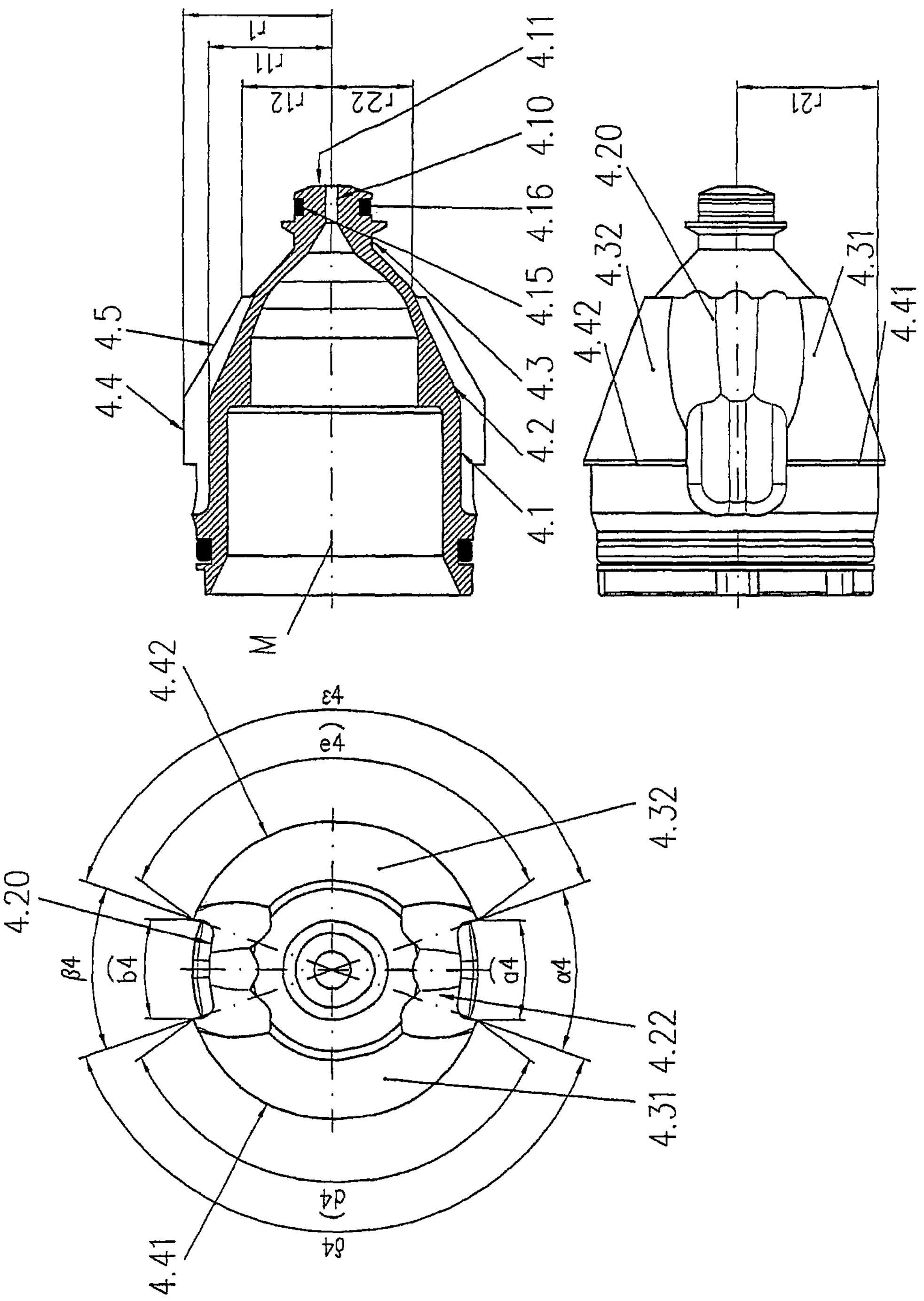
FIG. 8 depicts individual representations (top left: top view from the front; top right: longitudinal sectional view; bottom right: side view) of the nozzle of FIG. 7.

FIG. 8 shows the nozzle 4 of the plasma torch head of FIG. 7. A nozzle bore 4.10 allows for the exit of a plasma gas beam at a nozzle tip 4.11, a first section 4.1, of which the outer surface 4.4 is essentially cylindrical, and a second section 4.2 connecting thereto towards the nozzle tip 4.11, of which second section 4.2 the outer surface 4.5 tapers essentially conically towards the nozzle tip 4.11. The cooling liquid supply groove 4.20 and the cooling liquid return groove 4.22 extend over a part of the first section 4.1 and over the second section 4.2 in the outer surface 4.5 of the nozzle 4 towards the nozzle tip 4.11 and end before the cylindrical outer face 4.3. The middle point of the cooling liquid supply groove 4.20 and the middle point of the cooling liquid return groove 4.22 are arranged offset relative to each other by 180° around the circumference of the nozzle 4 and are of equal size. Disposed between the cooling liquid supply groove 4.20 and the cooling liquid return groove 4.22 are outwardly projecting regions 4.31 and 4.32 with associated sections 4.41 and 4.42.

Figure 9:
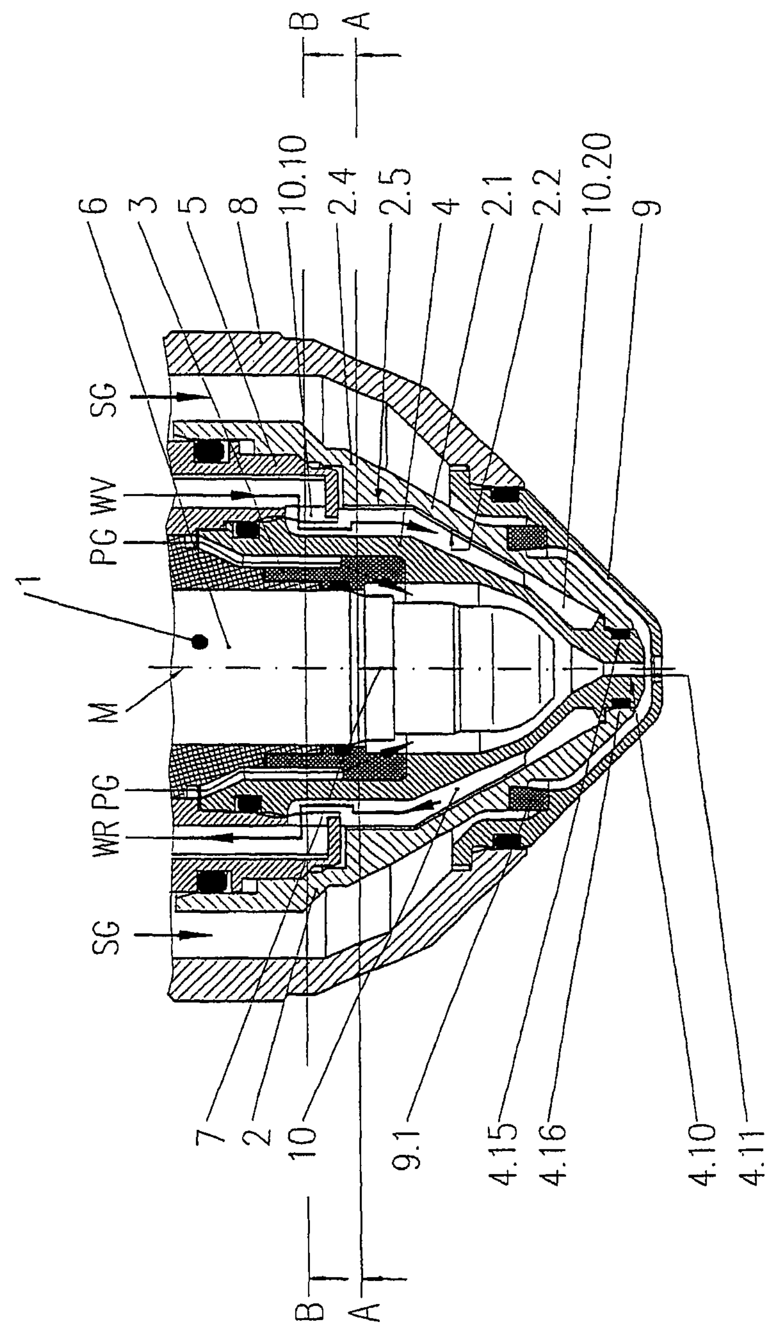
FIG. 9 depicts a longitudinal sectional view through a plasma torch head with plasma and secondary gas supply with a nozzle according to one embodiment of the invention.

FIG. 9 shows a plasma torch head according to a further special embodiment of the invention. The nozzle 4 has two cooling liquid supply grooves 4.20 and 4.21. The cooling liquid is conveyed virtually perpendicular to the longitudinal axis of the plasma torch head 1 from the nozzle holder 5, contacting the nozzle 4, into the cooling liquid chamber 10. The cooling liquid is deflected in a deflection area 10.10 of the cooling liquid chamber 10 from the direction parallel to the longitudinal axis in the bore of the cooling liquid supply WV of the plasma torch in the direction of the first nozzle section 4.1 virtually perpendicular to the longitudinal axis of the plasma torch head 1. The cooling liquid then flows through a groove 5.1 of the nozzle holder 5 into the two areas 10.11 and 10.12 formed by the cooling liquid supply grooves 4.20 and 4.21 of the nozzle 4 and the nozzle cap 2 to the region 10.20 of the cooling liquid chamber 10 surrounding the nozzle bore 4.10, and flows around the nozzle 4. The cooling liquid then flows through the area 10.15 formed by the cooling liquid return groove 4.22 of the nozzle 4 and the nozzle cap 2 back to the cooling liquid return WR, whereby the transition takes place virtually perpendicular to the longitudinal axis of the plasma torch head, through a deflection area 10.10.

Figure 9A:
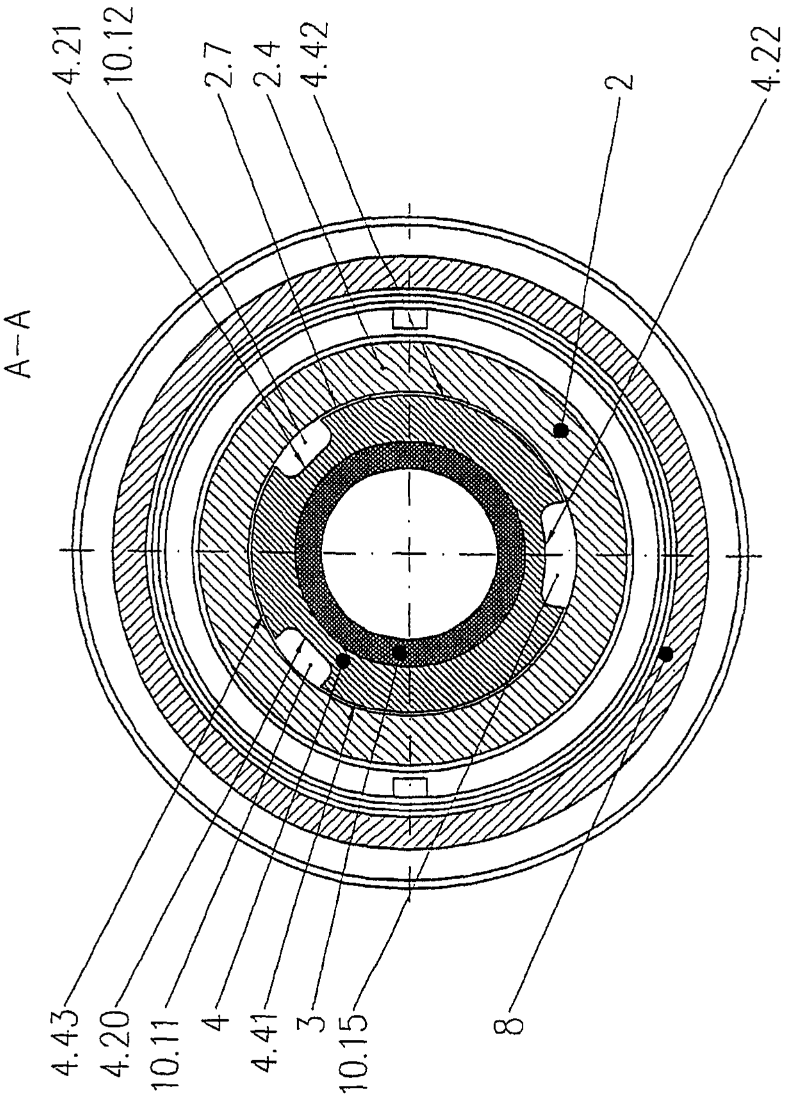
FIG. 9*a* depicts a sectional representation along line A-A of FIG. 9.

FIG. 9*a* shows a sectional representation along the line A-A of the plasma torch of FIG. 9. Areas 10.11 and 10.12 are formed by the cooling liquid supply grooves 4.20 and 4.21 of the nozzle 4 and the nozzle cap 2 to prevent, through the sections 4.41 and 4.42 of the projecting regions 4.31 and 4.32 of the nozzle 4 in combination with the inner surface of the nozzle cap 2, a secondary connection between the cooling liquid supply and the cooling liquid return. A secondary connection between the areas 10.11 and 10.12 is prevented through the section 4.43 of the projecting region 4.33.

Figure 9B:
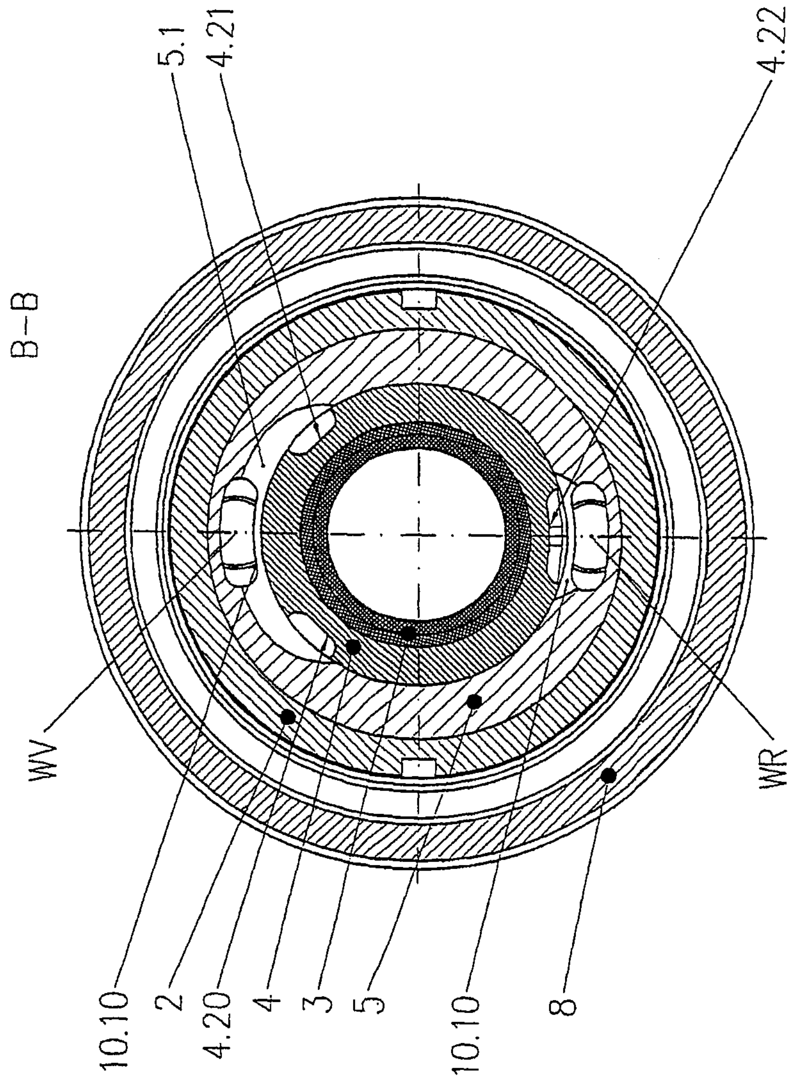
FIG. 9*b* depicts a sectional representation along the line B-B of FIG. 9.

FIG. 9*b* shows a sectional representation along the line B-B of the plasma torch head of FIG. 9. depicting the plane of the deflection areas 10.10 and the connection to both cooling liquid supplies 4.20 and 4.21 through the groove 5.1 in the nozzle holder 5.

Figure 10:
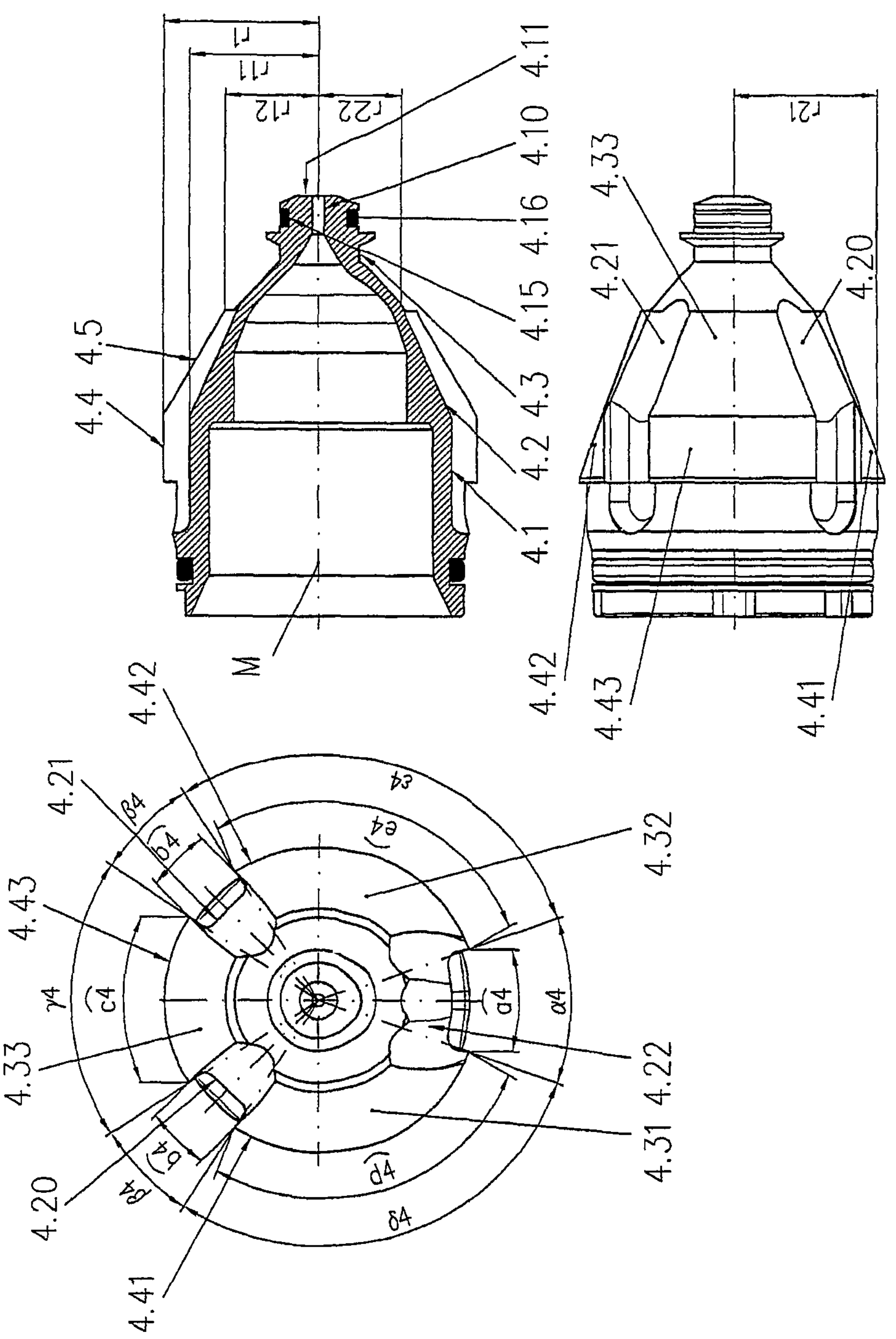
FIG. 10 depicts individual representations (top left: top view from the front; top right: longitudinal sectional view; bottom right: side view) of the nozzle of FIG. 9.

FIG. 10 shows the nozzle 4 of the plasma torch head of FIG. 9. A nozzle bore 4.10 for the exit of a plasma gas beam is positioned at a nozzle tip 4.11, a first section 4.1, of which the outer surface 4.4 is essentially cylindrical, and a second section 4.2 connecting thereto towards the nozzle tip 4.11, of which second section 4.2 the outer surface 4.5 tapers essentially conically towards the nozzle tip 4.11. The cooling liquid supply grooves 4.20 and 4.21 extend over a part of the first section 4.1 and over the second section 4.2 in the outer surface 4.5 of the nozzle 4 towards the nozzle tip 4.11 and end before the cylindrical outer surface 4.3. The cooling liquid return groove 4.22 extends over the second section 4.2 and the first section 4.1 in the outer surface 4.5 of the nozzle 4. Disposed between the cooling liquid supply grooves 4.20; 4.21 and the cooling liquid return groove 4.22 are the outwardly projecting regions 4.31; 4.32 and 4.33 with the associated sections 4.41, 4.42, and 4.43.

Figure 11:
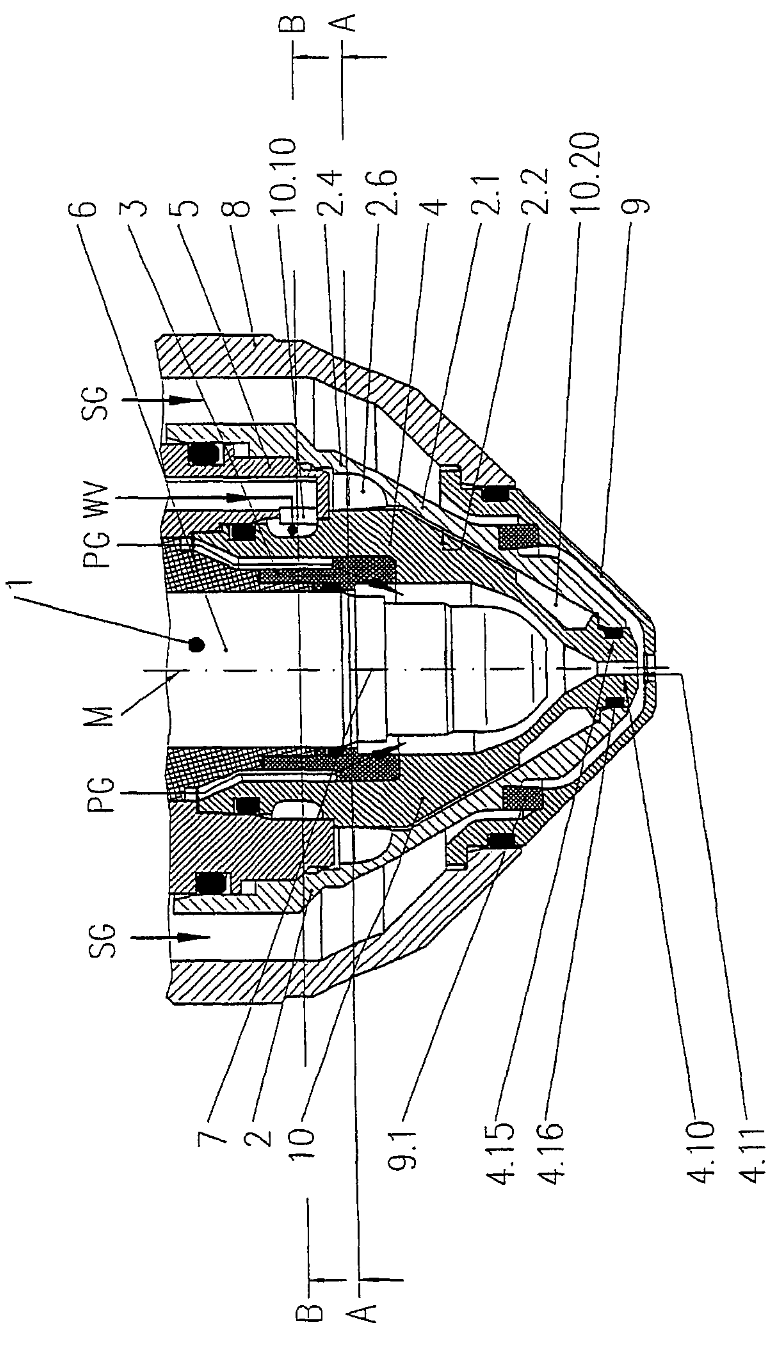
FIG. 11 depicts longitudinal sectional view through a plasma torch head with plasma and secondary gas supply with a nozzle according to one embodiment of the invention.

FIG. 11 shows a plasma torch head similar to FIG. 5 according to a contemplated invention embodiment. The bores of the cooling liquid supply WV and of the cooling liquid return are arranged offset at an angle of 90°. The nozzle 4 has two cooling liquid supply grooves 4.20 and 4.21 and a groove 4.6 extending in the circumferential direction of the first section 4.1 around the entire circumference and connecting the cooling liquid supply grooves. The cooling liquid is conveyed virtually perpendicular to the longitudinal axis of the plasma torch head 1 from the nozzle holder 5, contacting the nozzle 4, into the cooling liquid chamber 10. The cooling liquid is deflected in the deflection area 10.10 of the cooling liquid chamber 10 from the direction parallel to the longitudinal axis in the bore of the cooling liquid supply WV of the plasma torch in the direction of the first nozzle section 4.1 virtually perpendicular to the longitudinal axis of the plasma torch head 1. The cooling liquid then flows through the groove 4.6, which extends in the circumferential direction of the first section 4.1 of the nozzle 4 on a partial circumference between the grooves 4.20 and 4.21, i.e. over around 300°, into the two areas 10.11 and 10.12 formed by the cooling liquid supply grooves 4.20 and 4.21 of the nozzle 4 and the nozzle cap 2 to the region 10.20 of the cooling liquid chamber 10 surrounding the nozzle bore 4.10, and flows around the nozzle 4. The cooling liquid then flows through the area 10.15 formed by the cooling liquid return groove 4.22 of the nozzle 4 and the nozzle cap 2 back to the cooling liquid return WR, whereby the transition takes place essentially parallel to the longitudinal axis of the plasma torch head.

Figure 11A:
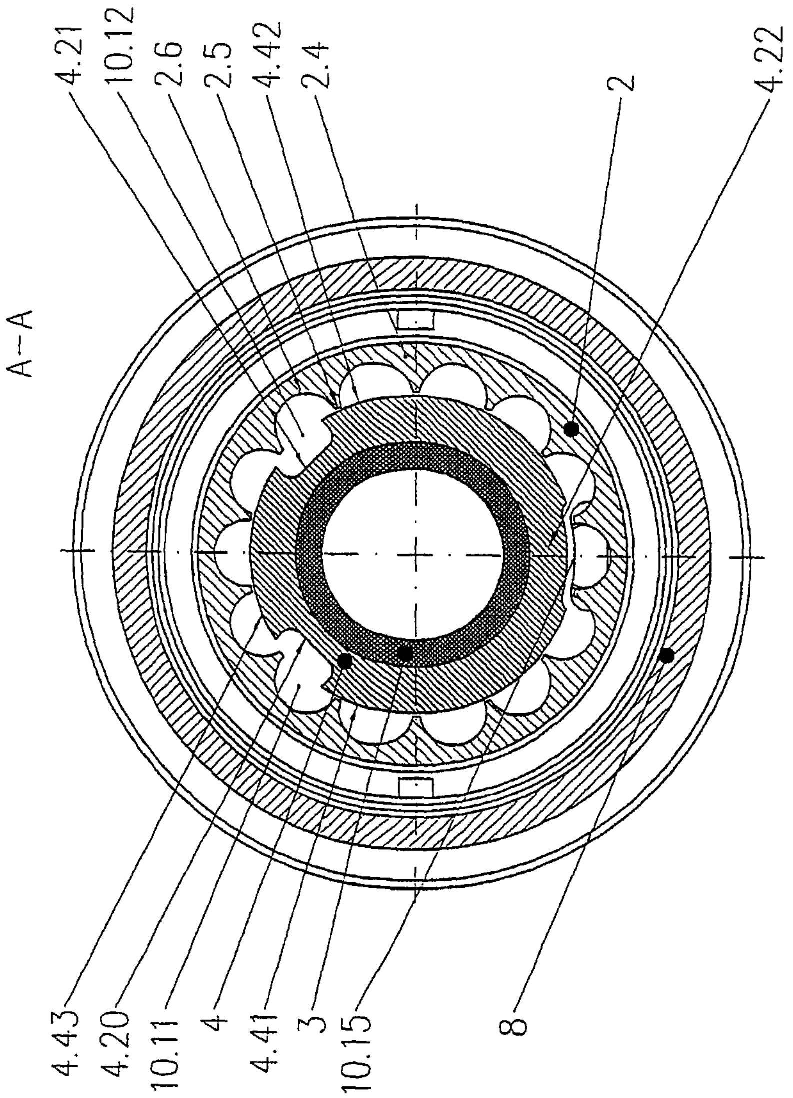
FIG. 11*a* depicts a sectional representation along the line A-A of FIG. 11.

FIG. 11*a* shows a sectional representation along the line A-A of the plasma torch of FIG. 11. Areas 10.11 and 10.12 are formed by the cooling liquid supply grooves 4.20 and 4.21 of the nozzle 4 and the nozzle cap 2 to prevent, through the sections 4.41 and 4.42 of the projecting regions 4.31 and 4.32 of the nozzle 4 in combination with the inner surface 2.5 of the nozzle cap 2, a secondary connection between the cooling liquid supply and the cooling liquid return. A secondary connection between the areas 10.11 and 10.12 is prevented through the section 4.43 of the projecting region 4.33. In order to ensure that the secondary connection of the cooling liquid is prevented in each position of the nozzle 4 relative to the nozzle cap 2, the circular measures d4 and e4 of the sections 4.41 and 4.42 of the nozzle 4 must be at least as large as the circular measure b2 of recesses 2.6, facing the nozzle, of the nozzle cap 2.

Figure 11B:
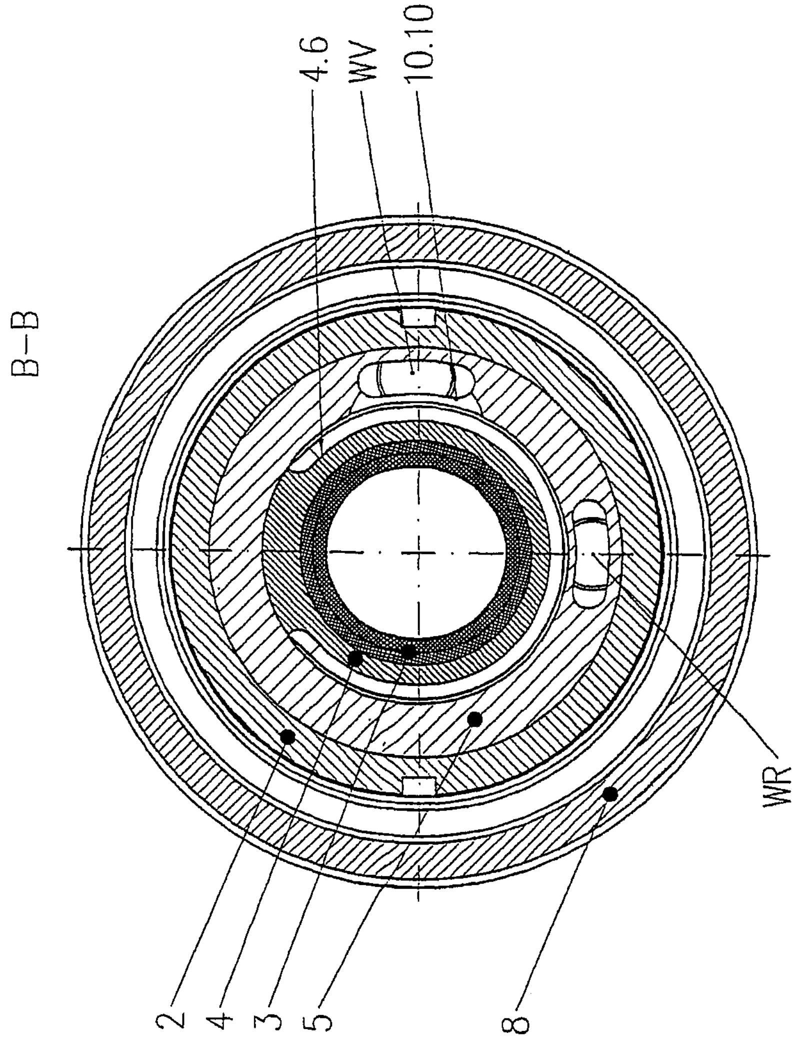
FIG. 11*b* depicts a sectional representation along the line B-B of FIG. 11.

FIG. 11*b* shows a sectional representation along the line B-B of the plasma torch of FIG. 11. The plane of the deflection area 10.10 and the connection with the two cooling liquid supplies through the groove 4.6 extend over approximately 300° in the nozzle 4 and the bores are arranged offset by 90° for the cooling liquid supply WV and the cooling liquid return WR.

Figure 12:
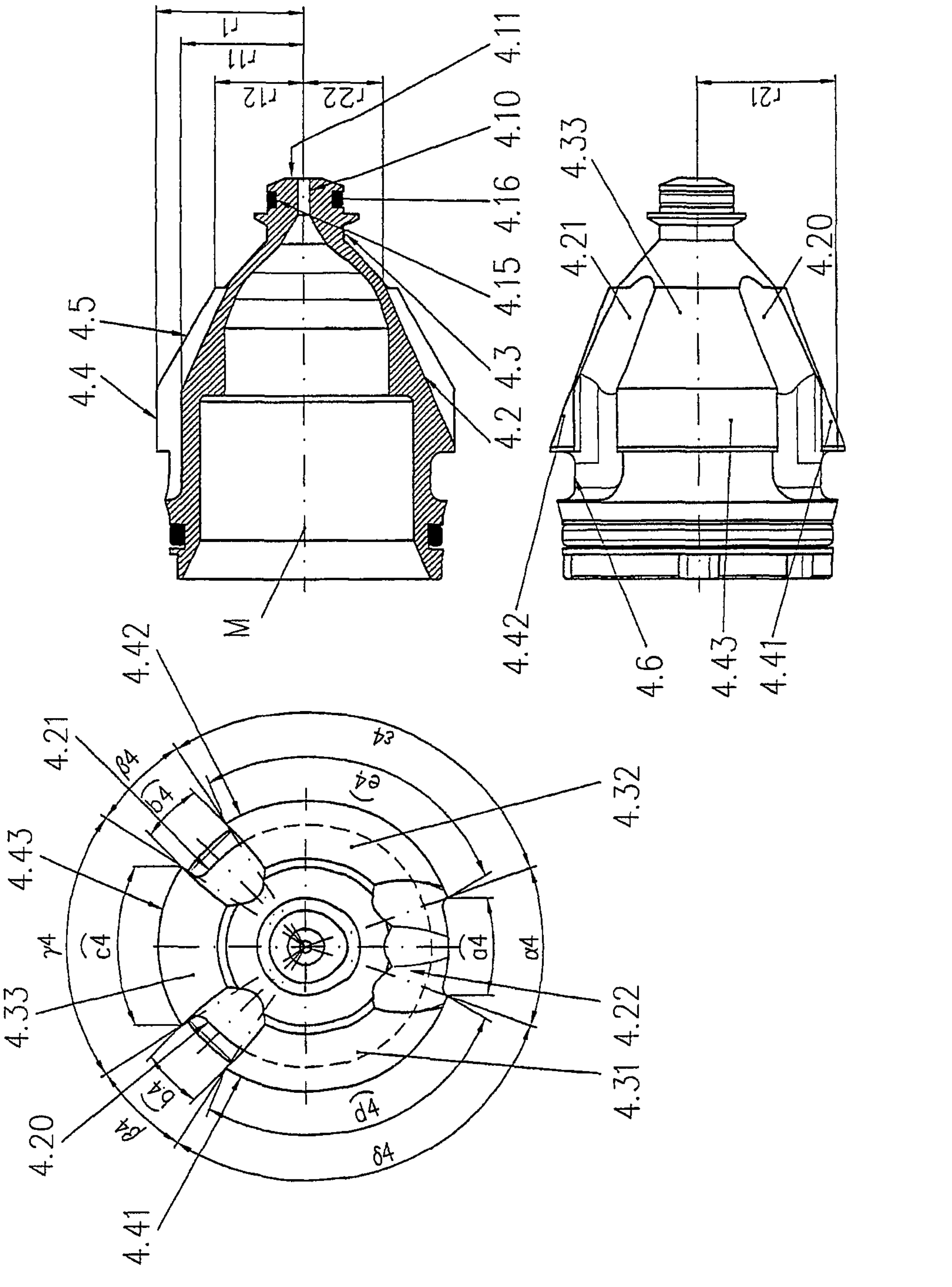
FIG. 12 depicts individual representations (top left: top view from the front; top right: longitudinal sectional view; bottom right: side view) of the nozzle of FIG. 11.

FIG. 12 shows the nozzle 4 of the plasma torch head of FIG. 11. A nozzle bore 4.10 is provided for the exit of a plasma gas beam at a nozzle tip 4.11, a first section 4.1, of which the outer surface 4.4 is essentially cylindrical, and a second section 4.2 connecting thereto towards the nozzle tip 4.11, of which second section 4.2 the outer surface 4.5 tapers essentially conically towards the nozzle tip 4.11. The cooling liquid supply grooves 4.20 and 4.21 extend over a part of the first section 4.1 and over the second section 4.2 in the outer surface 4.5 of the nozzle 4 towards the nozzle tip 4.11 and end before the cylindrical outer surface 4.3. The cooling liquid return groove 4.22 extends over the second section 4.2 of the nozzle 4. Disposed between the cooling liquid supply grooves 4.20; 4.21 and the cooling liquid return groove 4.22 are the outwardly projecting regions 4.31; 4.32 and 4.33 with the associated sections 4.41; 4.42 and 4.43. The cooling liquid supply grooves 4.20 and 4.21 are connected to each other by a groove 4.6, of the nozzle, extending in the circumferential direction of the first section 4.1 of the nozzle on a partial circumference between the grooves 4.20 and 4.21, i.e. over approximately 300°. This is particularly advantageous for the cooling of the transition between the nozzle holder 5 and the nozzle 4.

Figure 13:
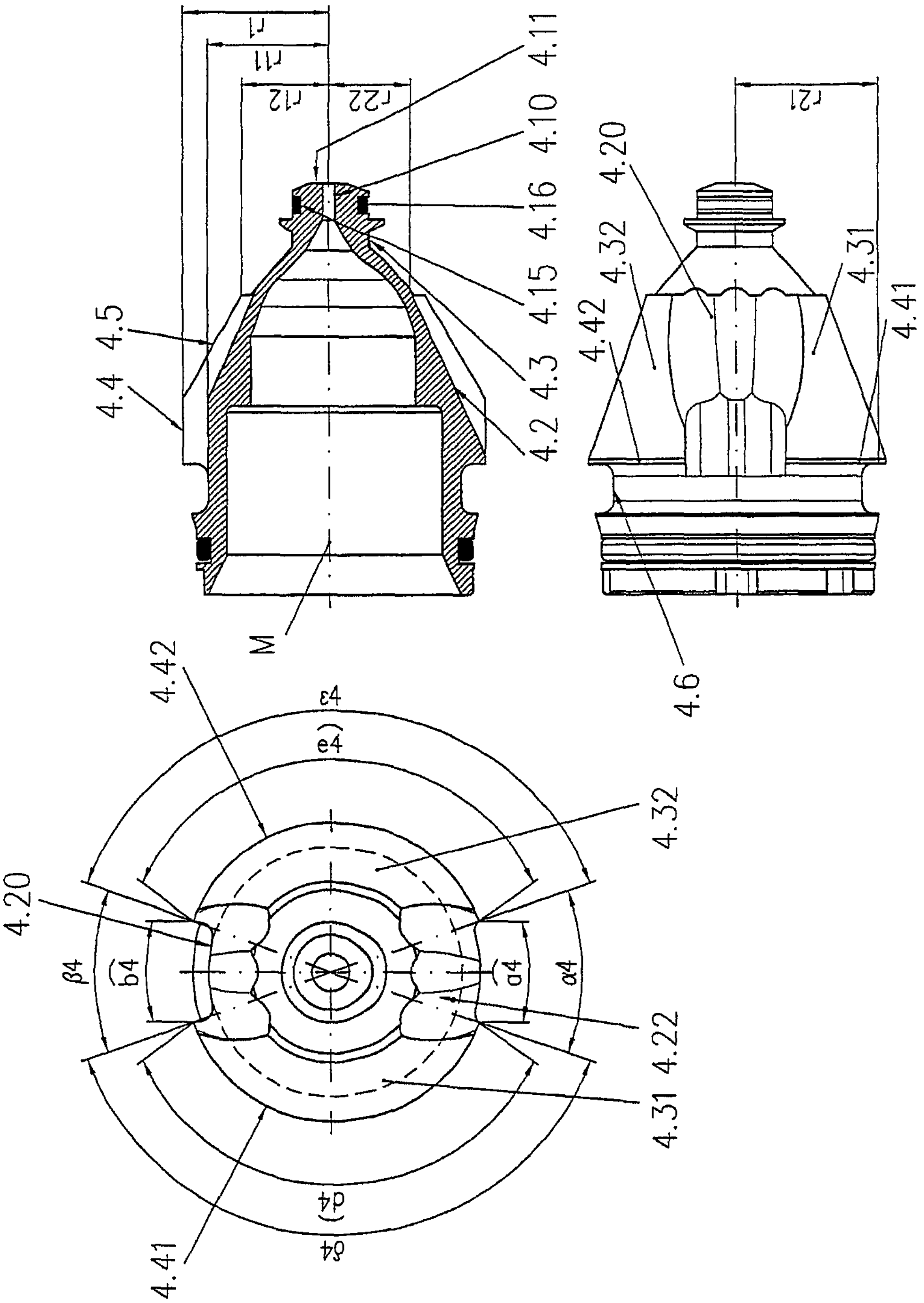
FIG. 13 depicts individual representations (top left: top view from the front: top right: longitudinal sectional view; bottom right: side view) of the nozzle according to one embodiment of the invention.

FIG. 13 shows a nozzle according to another contemplated embodiment of the invention, which can be inserted into the plasma torch head according to FIG. 8. The cooling liquid supply groove 4.20 is connected to a groove 4.6, which extends in the circumferential direction around the entire circumference. This has the advantage that the bore for the cooling liquid supply WV and the cooling liquid return WR in the plasma torch head do not have to be arranged offset by exactly 180°, but instead can be offset by 90° as shown for example in FIG. 11. In addition this is advantageous for the cooling of the transition between the nozzle holder 5 and the nozzle 4. The same arrangement can of course also be used for a cooling liquid return groove 4.22.

Figure 14:
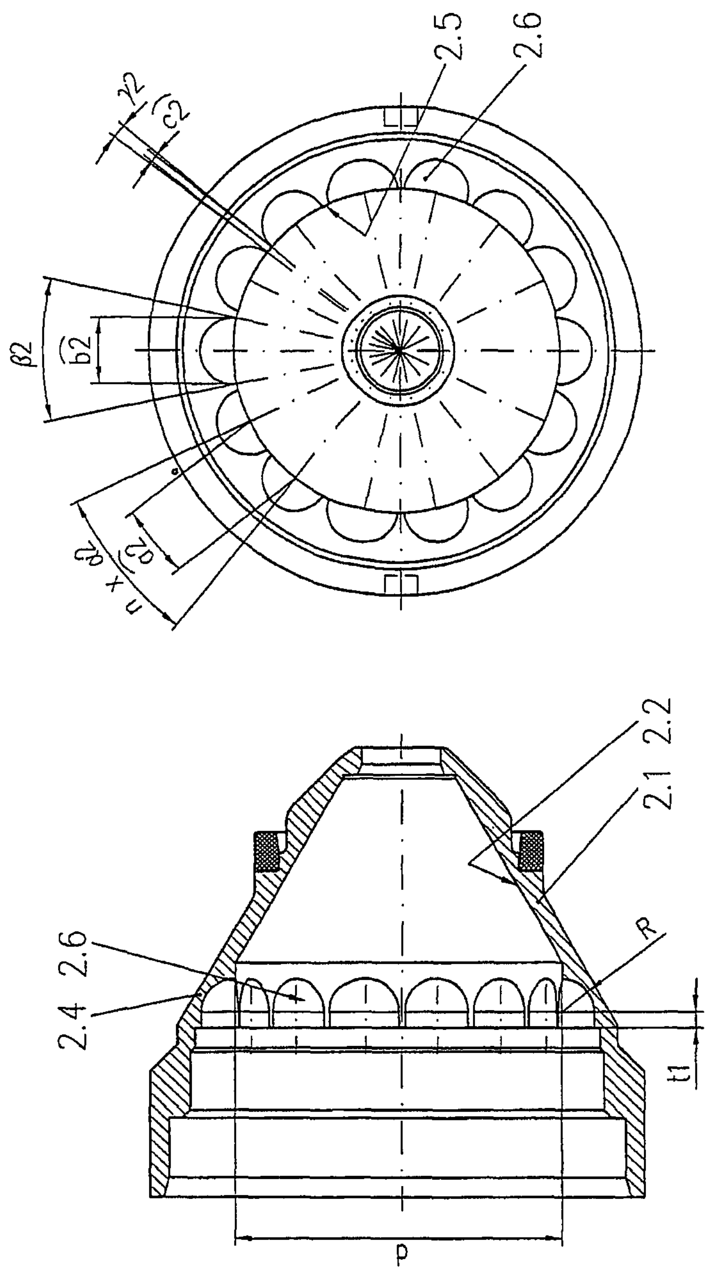
FIG. 14 depicts individual representations (left: longitudinal sectional view; right: top view from the front) of the nozzle cap of FIG. 1, FIG. 3 and FIG. 5 as well as FIG. 11.

FIG. 14 shows a nozzle cap 2 according to a further contemplated embodiment of the invention. The nozzle cap 2 comprises an inner surface 2.22 tapering essentially conically, which in this case comprises recesses 2.6 in a radial plane 14. The recesses 2.6 are arranged equidistantly around the inner circumference and in a semicircular form in the radial section.

Figure 15:
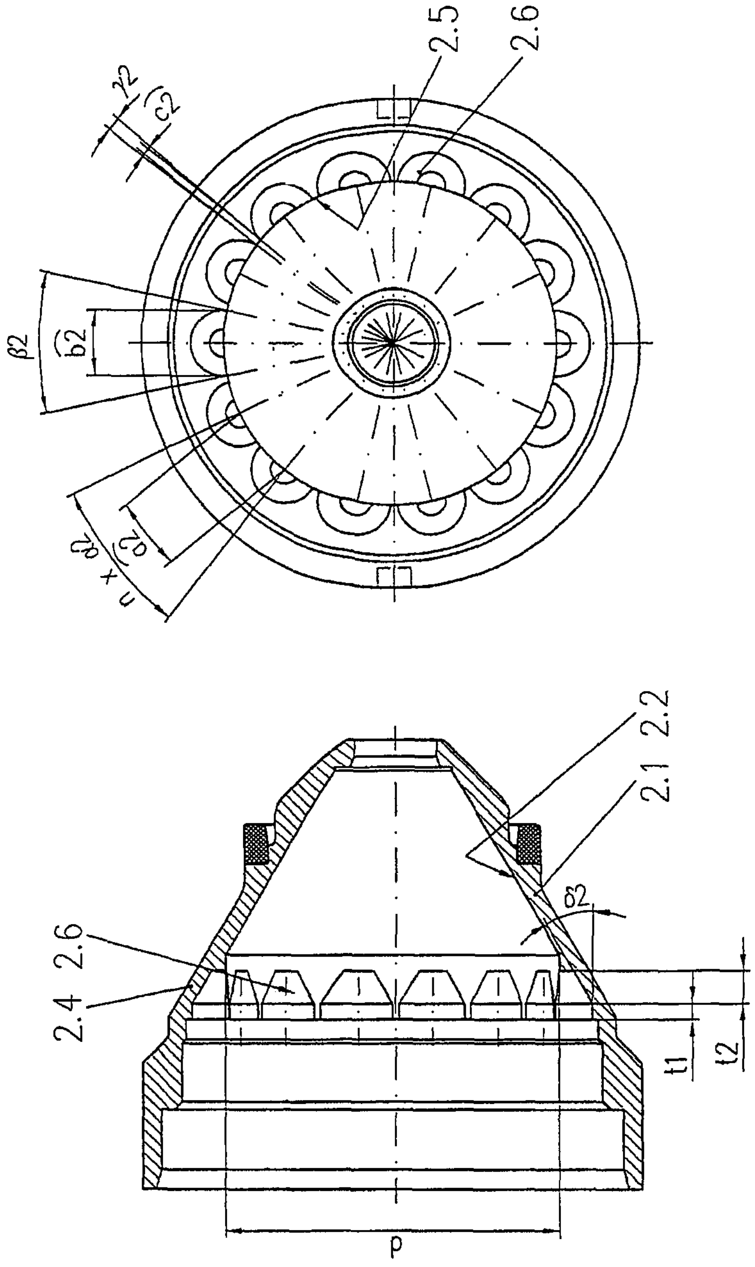
FIG. 15 depicts individual representations (left: longitudinal sectional view; right: top view from the front) of a nozzle cap according to one embodiment of the invention.
Figure 16:
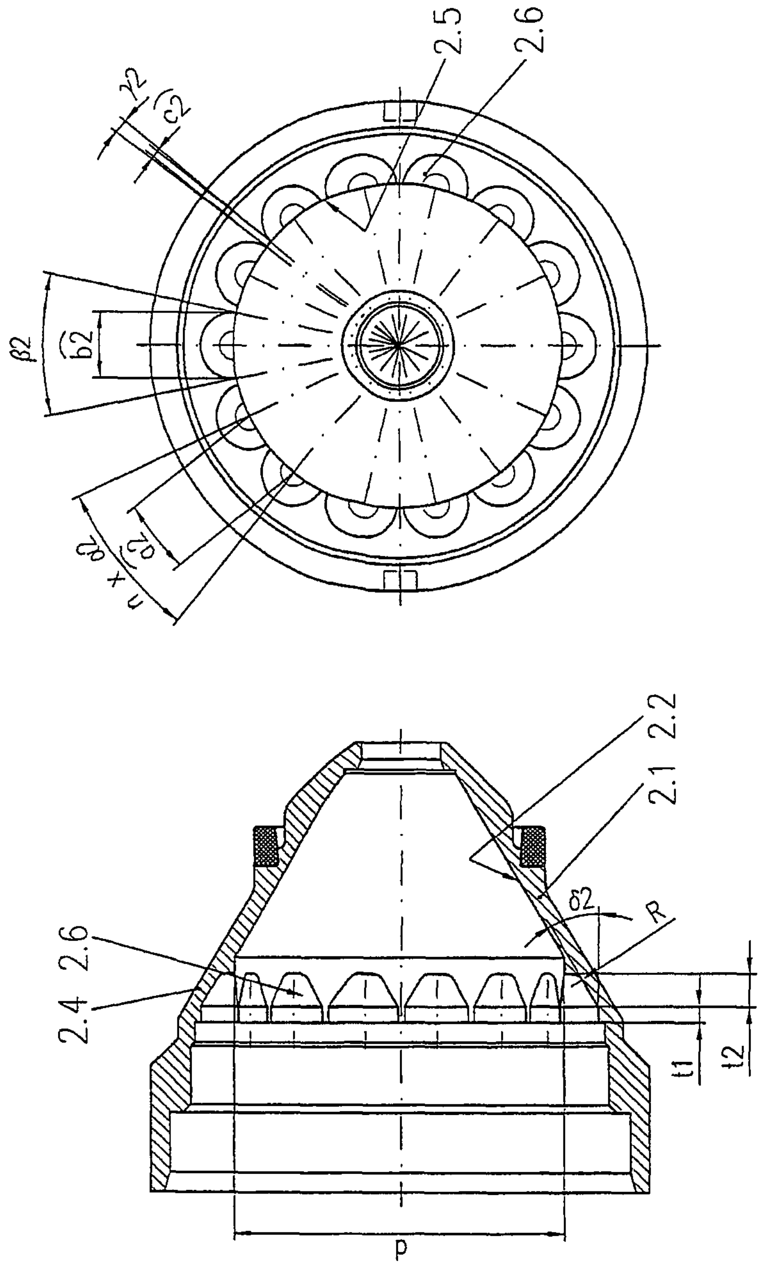
FIG. 16 depicts individual representations (left: longitudinal sectional view; right: top view from the front) of a nozzle cap according to one embodiment of the invention.

The nozzle caps shown in FIGS. 15 and 16 according to further particular embodiments of the invention differ from the embodiment shown in FIG. 14 due to the inclusion of recesses 2.6. The recesses 2.6 in the depicted view of FIG. 15 are in the form of a truncated cone towards the nozzle tip, whereby in FIG. 16 the truncated cone shape is somewhat rounded off.

The features disclosed in the present description, in the drawings, and in the claims will be essential to the realization of the invention in its different embodiments both individually and in any combinations thereof.

The invention claimed is:

1. A nozzle for a liquid cooled plasma torch, comprising:

a nozzle bore for the exit of a plasma gas beam at a nozzle tip;

a first section of said nozzle, said first section having an outer surface that is essentially cylindrical;

a second section of said nozzle connecting said first section to said nozzle tip, said second section having an outer surface that tapers essentially conically towards said nozzle tip;

at least one liquid supply groove, said at least one liquid supply groove extending over a part of said first section and over said second section of said outer surface of said nozzle towards said nozzle tip;

a single liquid return groove that is separate from said at least one liquid supply groove, said liquid return groove extending over said second section of said nozzle; and another groove which is connected to said at least one liquid supply groove is disposed in said first section of said nozzle.

2. The nozzle of claim 1, said liquid return groove also extending over a part of said outer surface of said first section of said nozzle.

3. The nozzle of claim 1 further comprising at least two liquid supply grooves.

4. The nozzle of claim 1 further comprising a middle point of said at least one liquid supply groove and a middle point of said liquid return groove, said middle points of said at least one liquid supply groove and of said liquid return groove are arranged offset by about 180° relative to each other around the circumference of said nozzle.

5. The nozzle of claim 1, the width of said liquid return groove in the circumferential direction lies in the range from about 90° to 270°.

6. The nozzle of claim 1, said another groove extends in the circumferential direction of said first section of said nozzle around the entire circumference.

7. The nozzle of claim 1, said another groove extends in the circumferential direction of said first section of said nozzle over an angle in the range from about 60° to 300°.

8. The nozzle of claim 1, said another groove extends in the circumferential direction of said first section of said nozzle over an angle in the range from about 90° to 270°.

9. The nozzle of claim 1 further comprising two liquid supply grooves.

10. The nozzle of claim 9, said two liquid supply grooves being arranged around the circumference of said nozzle symmetrically to a straight line extending from the middle point of said liquid return groove at a right angle through the longitudinal axis of said nozzle.

11. The nozzle of claim 9, the middle points of said two liquid supply grooves are arranged offset relative to each other around the circumference of said nozzle at an angle which lies in the range from about 30° to 180°.

12. The nozzle of claim 9, the width of said liquid return groove in the circumferential direction lies in the range from about 120° to 270°.

13. The nozzle of claim 9, said two liquid supply grooves are connected to each other in said first section of said nozzle.

14. The nozzle of claim 9, said two liquid supply grooves are connected to each other in said first section of said nozzle by a groove.

15. The nozzle of claim 14, said groove goes beyond one or both of said liquid supply grooves.

16. The nozzle of claim 14, said groove extending in the circumferential direction of said first section of said nozzle around the whole circumference of said nozzle.

17. The nozzle of claim 14, said groove extending in the circumferential direction of said first section of said nozzle over an angle in the range from about 60° to 300°.

18. The nozzle of claim 14, said groove extending in the circumferential direction of said first section of said nozzle over an angle in the range from about 90° to 270°.

19. The nozzle of claim 1 further comprising a nozzle cap, said nozzle cap having an inner surface tapering essentially conically, said inner surface including at least two recesses in a radial plane.

20. The nozzle of claim 1 further comprising a nozzle cap, said nozzle cap having an inner surface tapering essentially conically, said inner surface including at least two recesses in a radial plane, said at least two recesses being arranged equidistantly around said inner circumference of said nozzle.

21. The nozzle of claim 1 further comprising a nozzle cap, said nozzle cap having an inner surface tapering essentially conically, said inner surface including at least three recesses in a radial plane.

22. The nozzle of claim 1 further comprising a nozzle cap, said nozzle cap having an inner surface tapering essentially conically, said inner surface including at least two recesses in a radial plane, said recesses being in semicircular form in said radial plane.

23. A nozzle for a liquid cooled plasma torch, comprising:
a nozzle bore for the exit of a plasma gas beam at a nozzle tip;
a first section of said nozzle, said first section having an outer surface that is essentially cylindrical;
a second section of said nozzle connecting said first section to said nozzle tip, said second section having an outer surface that tapers essentially conically towards said nozzle tip;
a single liquid supply groove, said liquid supply groove extending over a part of said first section and over said second section of said outer surface of said nozzle towards said nozzle tip;
at least one liquid return groove that is separate from said liquid supply groove, said at least one liquid return groove extending over said second section of said nozzle; and
another groove which is connected to said single liquid supply groove is disposed in said first section of said nozzle.

24. The nozzle of claim 23, said at least one liquid return groove also extending over a part of said outer surface of said first section of said nozzle.

25. The nozzle of claim 23 further comprising at least two liquid return grooves.

26. The nozzle of claim 23 further comprising a middle point of said liquid supply groove and a middle point of said at least one liquid return groove, said middle points of said liquid supply groove and of said at least one liquid return groove are arranged offset by about 180° relative to each other around the circumference of said nozzle.

27. The nozzle of claim 23, the width of said liquid supply groove in the circumferential direction lies in the range from about 90° to 270°.

28. The nozzle of claim 23, said another groove extends in the circumferential direction of said first section of said nozzle over an angle in the range from about 60° to 300°.

29. The nozzle of claim 23, said another groove extends in the circumferential direction of said first section of said nozzle over an angle in the range from about 90° to 270°.

30. The nozzle of claim 23 comprising two liquid return grooves.

31. The nozzle of claim 30, said two liquid return grooves being, arranged around the circumference of said nozzle symmetrically to a straight line extending from the middle point of said liquid supply groove at a right angle through the longitudinal axis of said nozzle.

32. The nozzle of claim 30, the middle points of said two liquid return grooves are arranged offset relative to each other around the circumference of the nozzle at an angle which lies in the range from about 30° to 180°.

33. The nozzle of claim 30, the width of said liquid supply groove in the circumferential direction lies in the range from about 120° to 270°.

34. The nozzle of claim 30, said two return grooves are connected to each other in said first section of said nozzle.

35. The nozzle of claim 30, said two return grooves are connected to each other in said first section of said nozzle by a groove.

36. The nozzle of claim 35, said groove goes beyond one or both of said liquid return grooves.

37. The nozzle of claim 35, said groove extending in the circumferential direction of said first section of said nozzle over an angle in the range from about 60° to 300°.

38. The nozzle of claim 35, said groove extending in the circumferential direction of said first section of said nozzle over an angle in the range from about 90° to 270°.

39. The nozzle of claim 23 further comprising a nozzle cap, said nozzle cap having an inner surface tapering essentially conically, said inner surface including at least two recesses in a radial plane.

40. The nozzle of claim 23 further comprising a nozzle cap, said nozzle cap having an inner surface tapering essentially conically, said inner surface including at least two recesses in a radial plane, said at least two recesses being arranged equidistantly amund said inner circumference of said nozzle.

41. The nozzle of claim 23 further comprising a nozzle cap, said nozzle cap having a inner surface tapering essentially conically, said inner surface including at least three recesses in a radial plane.

42. The nozzle of claim 23 further comprising a nozzle cap, said nozzle cap having an inner surface tapering essentially conically, said inner surface including at least two recesses in a radial plane, said recesses being in semicircular form in said radial plane.

43. The nozzle of claim 23 further comprising:
a nozzle holder for holding said nozzle;
a nozzle cap, said nozzle cap and said nozzle being positioned to form a cooling chamber, said cooling liquid chamber being connectable, via two bores respectively offset by about 60° to 180°, to at least one of a cooling liquid supply line and a cooling liquid return line; and
said nozzle holder being positioned to allow cooling liquid to be conveyed at least one of:
virtually perpendicular to the longitudinal axis of said plasma torch contacting said nozzle, and into said cooling liquid chamber; and
virtually perpendicular to the longitudinal axis of said plasma torch from the cooling liquid chamber into the nozzle holder.

44. The nozzle of claim 43 further comprising:
said nozzle includes at least one cooling liquid supply groove and at least one projecting region;
an inner surface of said nozzle cap, said inner surface having at least two recesses having openings facing said nozzle, said recesses respectively extending over a circular recess measure;
said at least one projecting region of said nozzle having a circular projecting region measure; and
said circular projecting region measure of said nozzle adjacent, in the circumferential direction, to said at least one cooling liquid supply groove and projecting outwardly in relation to said at least one cooling liquid supply groove, is at least as large as said circular recess measure.

45. The nozzle of claim 44 further comprising, said nozzle cap having at least two liquid supply grooves.

46. The nozzle of claim 44 further comprising, said inner surface of said nozzle cap having at least three recesses.

47. The nozzle of claim 43 further comprising, said two bores each extending essentially parallel to the longitudinal axis of said plasma torch head.

48. The nozzle of claim 43 further comprising, said bores for said cooling liquid supply line and said cooling liquid return line are arranged offset by 180°.

49. The nozzle of claim 43 further comprising:

a section of said nozzle cap having a plurality of recesses, the circular measure of said section of said nozzle cap between said recesses being at least one of:

as a maximum half the size of the minimum circular measure of said liquid return groove; and as a maximum the minimum circular measure of at least one of said liquid supply groove and said nozzle.

* * * * *